United States Patent [19]

Chou et al.

[11] Patent Number: 5,689,644
[45] Date of Patent: Nov. 18, 1997

[54] NETWORK SWITCH WITH ARBITRATION SYTEM

[75] Inventors: Ger-Chih Chou; Kent Blair Dahlgren, both of San Jose; Wen-Jai Hsieh, Palo Alto, all of Calif.

[73] Assignee: I-Cube, Inc., Campbell, Calif.

[21] Appl. No.: 621,422

[22] Filed: Mar. 25, 1996

[51] Int. Cl.$^6$ .................................................. G06F 13/00
[52] U.S. Cl. .................. 395/200.06; 370/352; 370/424; 370/450
[58] Field of Search ................. 395/200.06, 200.12, 395/200.15, 200.21, 856, 858, 311, 728, 800, 825, 825.03, 826; 370/218, 250, 258, 299, 323, 352, 355, 356, 362, 386, 389, 422, 424, 447, 450

[56] References Cited

U.S. PATENT DOCUMENTS

| | | | |
|---|---|---|---|
| 4,814,762 | 3/1989 | Franaszek | 340/825.79 |
| 4,947,388 | 8/1990 | Kuwahara et al. | 370/411 |
| 5,355,364 | 10/1994 | Abali | 370/392 |
| 5,412,648 | 5/1995 | Fan | 370/414 |
| 5,418,780 | 5/1995 | Henrion | 370/397 |
| 5,428,800 | 6/1995 | Hsieh et al. | 395/310 |
| 5,430,442 | 7/1995 | Kaiser et al. | 340/825.79 |
| 5,434,855 | 7/1995 | Perlman et al. | 370/394 |
| 5,453,979 | 9/1995 | Schibler et al. | 370/395 |
| 5,546,391 | 8/1996 | Hochschild et al. | 370/413 |
| 5,613,069 | 3/1997 | Walker | 395/200.15 |

OTHER PUBLICATIONS

Yuval Tamir and Hsin-Chou Chi, *IEEE Transactions on Parallel and Distributed Systems*, vol. 4, No. 1, 1993, "Symmetric Crossbar Arbiters for VLSI Communication Switches," pp. 13-27.

*Primary Examiner*—Alpesh M. Shah
*Attorney, Agent, or Firm*—Smith-Hill and Bedell

[57] ABSTRACT

A local area network switch includes a set of input ports each receiving and storing incoming packets from a corresponding network station, a set of output ports each forwarding packets to a corresponding network station, and a switching system for routing packets from the input ports to the output ports. The output ports are interconnected to form an output token passing ring and the input ports are interconnected to form an input token passing ring. Whenever an idle output port receives the output token, it holds the output token and signals the input ports to start an input token passing cycle. During an input token passing cycle, an input port storing a packet destined for an output token holder terminates the input token passing cycle when it receives the input token and signals the switching system to establish a connection to the output token holder. To fairly distribute arbitration priority, input and output ports starting positions are rotated for successive input and output token passing cycles.

20 Claims, 19 Drawing Sheets

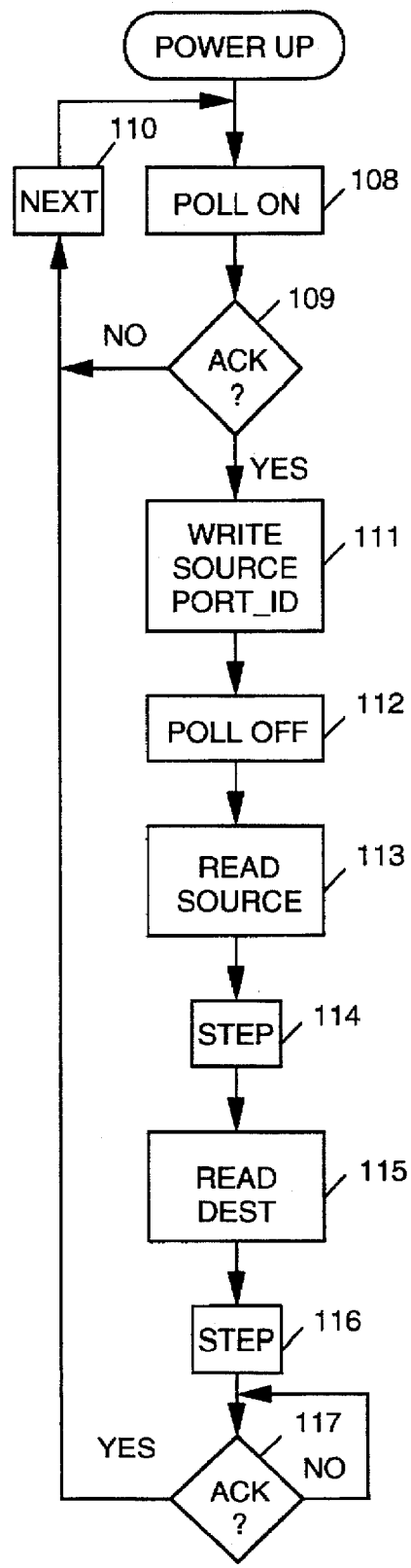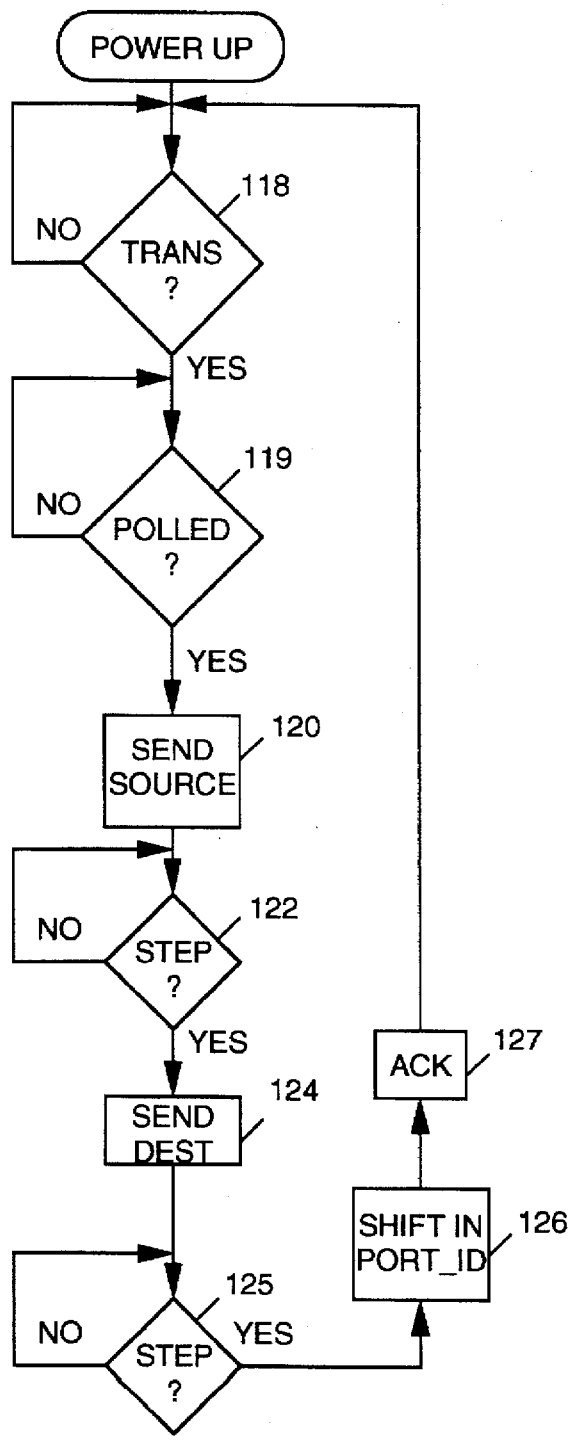
FIG. 8
FIG. 9

NETWORK SWITCH WITH ARBITRATION SYTEM

BACKGROUND OF THE INVENTION

1. Field of the Invention

The present invention relates in general to a switch for routing data between network stations, and in particular to a switch including a system for arbitrating competing demands for routing paths through the switch.

2. Description of Related Art

Networks transfer data between computers or other types of network stations. For example 10BASE-T Ethernet systems use sets of twisted pair conductors in a star network topology to connect network stations to a central hub or switch. A 10BASE-T hub is simply a repeater receiving a data packet from any one station and rebroadcasting it to all other stations. A header in the data packet indicates the intended destination station for the packet and each network station looks at the packet header to determine if it should accept or ignore the packet. One disadvantage to a hub repeater is that the twisted pair that carries data packets to each network station not only must convey packets directed to that station but packets directed to all other stations as well. Thus only one network station can transmit a packet at any given time.

A network switch, on the other hand, routes an incoming packet only to its destination station so that each network station receives only the packet traffic directed to it and many network switches handle multiple packet transmission concurrently. A network switch includes input ports for receiving packets from the network stations, output ports for transmitting packets to the network stations and a switching mechanism selectively routing each incoming packet from an input port to the appropriate output port. The input port typically stores an incoming packet, determines the destination output port from the routing data included in the packet header, and then arbitrates for a switch connection between the input port and the destination output port. When the connection is established, the input port sends the packet to the output port via the switch.

Since input ports may have competing connection requests, a network switch must provide some kind of arbitration system to determine an order in which requests are granted. In a typical network switch, each input port sends its connection request to a central arbiter. The central arbiter monitors the busy status of the output ports and determines an order in which pending requests are granted when an output port becomes idle. When the arbiter grants a request it sends control data to the switching mechanism causing it to make the desired connection between input and output ports and then sends an acknowledgment to the input port that made the request. The input port then forwards the data to the output port via the switching mechanism. Typically the central arbiter assigns a priority level to each input and/or output port and always requests to the highest priority ports. Many central arbiters rotate input and output port priority so as to fairly distribute connection rights over time.

The article "Symmetric Crossbar Arbiters for VLSI Communication Switches" published *****, 1993 by Tamir et al in IEEE Transactions on Parallel and Distributed Systems, Vol. 4, No. 1, discloses a centralized "wave front" arbiter for a N×N crosspoint switch routing data between N network stations. The arbiter includes an N×N array of arbitration cells, one for each possible connection of the crosspoint switch. Each input port corresponds to one row of cells and supplies a separate request signal to each cell of the row. Each output port corresponds to one column of cells and supplies a separate busy signal to each cell of the column. The cells are ranked according to priority. When an input port seeks a connection to an output port it asserts the one of N output request signals. The asserted request signal drives the arbitration cell in the column corresponding to the output port. That arbitration cell grants a request when not otherwise inhibited from doing so by a higher priority cell. Priority is periodically shifted from cell to cell using token passing rings to provide equitable allocation of connection rights to both input and output ports. One problem with this system is that the arbitration system grows with square of the number N of network stations and becomes difficult to implement.

U.S. Pat. No. 4,814,762 issued Mar. 21, 1989 to Franaszek describes a network switch employing a crosspoint switch wherein the arbitration system is decentralized. To arbitrate for connections, input and output ports communicate directly with one another through a "delta" network. When an input port receives a packet it sends a request to the output port via the delta network. When an output port receives a connection request it returns a response to the input port via the delta network. The response gives the input port a time when it can make the requested connection between input and output ports. At the indicated time, the input port sends control data to the crosspoint switch establishing the connection. The delta network is formed by several stages of routing nodes. Each routing node receives a request from one of two input ports or from one of two nodes of a preceding stage. On receiving a request a node looks at a destination port address included in the request and then forwards the request to one of two nodes of a next stage or to one of two output ports. Thus a request works its way between input and output ports by hopping from node to node. Responses travel from output port to input port through the delta network in a similar manner. The delta network inherently arbitrates competing requests for the same output node on a first come, first-served basis. In this system the size of the arbiter also increases more rapidly than the number of network stations.

U.S. Pat. No. 5,430,442 issued Jul. 4, 1995 to Kaiser et al discloses a partially distributed arbitration system for a network switch having several ports interconnected by a crosspoint switch. In this system arbitration for the right to connect is handled by a central arbiter but control of the crosspoint switch is distributed among the ports. The ports and the arbiter are interconnected by a common arbitration bus. Each input port receiving a packet from a network source sends a connection request over the arbitration bus to the central arbiter. The arbiter decides the order in which to grant connection requests and signals the input port via the bus when its request is granted. When a connection request is granted, the input port directly queries the destination output port via the bus to determine if the destination output port is busy. If the destination port is not busy, the receiving port sends control data to the crosspoint switch to establish the connection. The arbitration system does not grow appreciably as the number of network stations increases, but the bandwidth of the arbitration bus limits the speed with which the system can handle requests.

What is needed is a network switch having a compact arbitration system which can quickly and equitably respond to connection requests from large numbers of network stations.

SUMMARY OF THE INVENTION

A local area network switch in accordance with the present invention switch includes a set of input ports for receiving and storing incoming packets from corresponding network stations, a set of output ports for forwarding packets to corresponding network stations, and a switching system for selectively routing packets from the input ports to the output ports. The input and output ports and the switching system are interconnected by a global communication bus. The output ports are also interconnected to form an output token passing ring while the input ports are interconnected to form an input token passing ring. When an idle output port receives an output token, it signals the input ports via the global bus to start an input token passing cycle. The output token holder also sends its identification code (ID) to the switching system via the global bus. During the input token passing cycle, any input port storing a packet destined for the output token holder may establish a connection to the output token holder if it is the first such input port to receive the input token. The input port establishes the connection by sending its ID to the switching system via the global bus. The switching system, having received the IDs of the input and output ports establishes the connection there between.

The token passing rings operate quickly and can service a large number of ports efficiently. Since information passes through the global bus only to start token passing cycles and to send port IDs to the switching system when a connection is to be made, bandwidth limitations of the global bus do not appreciably affect arbitration time.

It is accordingly an object of the present invention to provide a switch for routing data between network stations.

It is another object of the present invention to provide a system for arbitrating competing demands for switch routing resources.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 8 is a flow chart illustrating operation of state machine 100 of FIG. 7, FIG. 9 is a flow chart illustrating operation of state machine 95 of FIG. 7.

DESCRIPTION OF THE PREFERRED EMBODIMENTS

Figure 1:
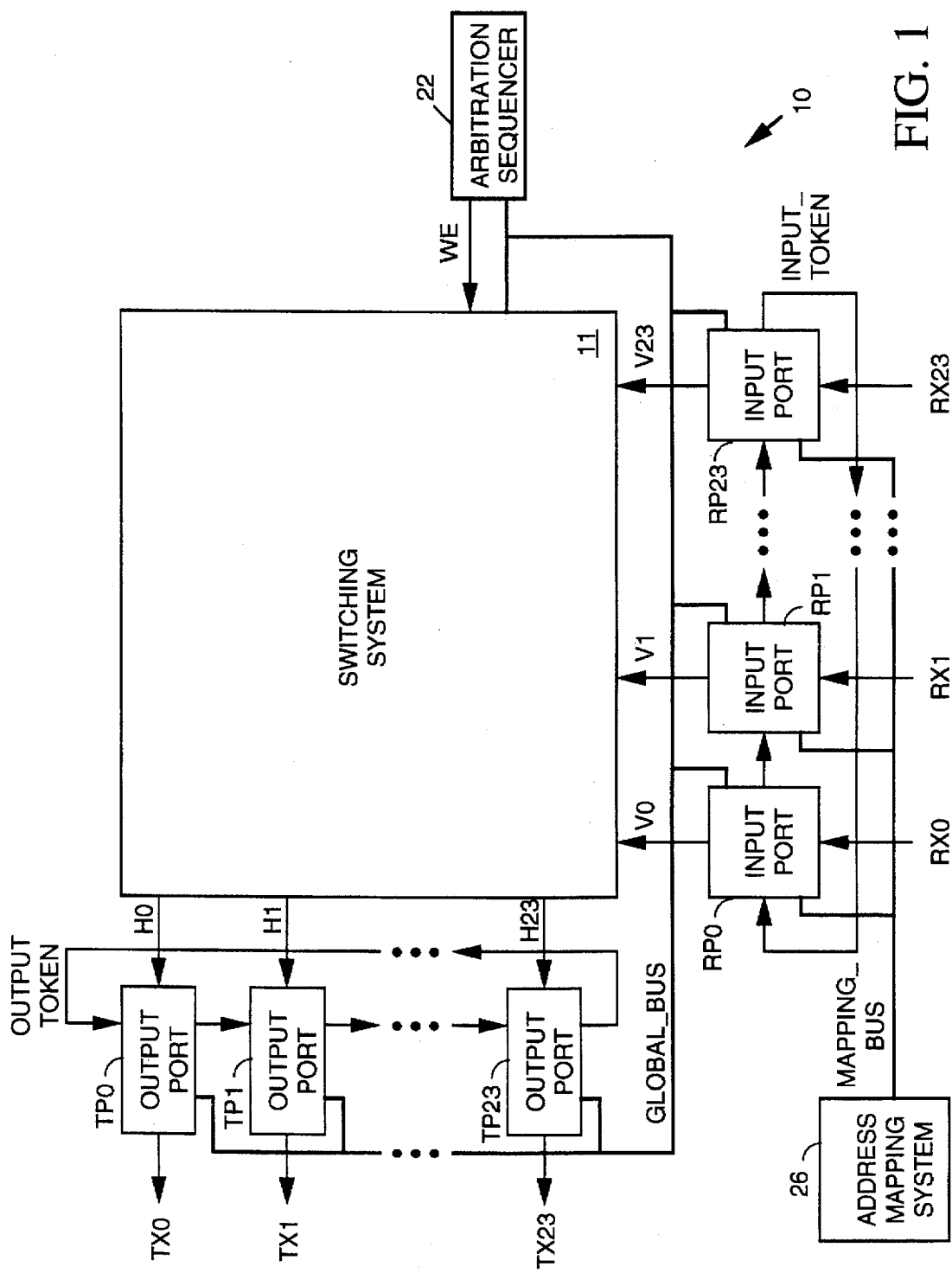
FIGS. 1 and 2 illustrate a local area network (LAN) switch 10 in accordance with the present invention for routing serial data packets between up to 24 network stations.

FIG. 1A illustrates a local area network (LAN) switch 10 in accordance with the present invention for routing serial data packets between up to 24 network stations. Switch 10 receives data packets from network stations via serial input buses RX0–RX23 and forwards then to the network stations via serial output buses TX0–TX23.

Switch 10 includes a set of input ports RP0–RP23 each receiving and storing incoming packets arriving on a corresponding one of input buses RX0–RX23 and a set of output ports TP0–TP23, each storing packets for transmission outward on a corresponding one of output buses TX0–TX23. A switching system 11 routes packets stored in the input ports RP0–RP23 to the appropriate one of output ports TP0–TP23. The switching system 11 includes a set of 24 "vertical" conductors V0–V23, each connected to a corresponding one of input ports RP0–RP23 and a set of 24 "horizontal" conductors H0–H23, each connected to a corresponding one of output ports TP0–TP23. In response to input control data conveyed on a global bus (GLOBAL_BUS) from the input and output ports, switching system 11 can make and break connections between any pair of horizontal and vertical conductors, thereby making or breaking a packet routing path from any input port to any output port.

The input ports RP0–RP23 access an address mapping system 26 through a bus MAPPING_BUS. The mapping system 26 relates the network address of each network station to the particular output buffer TP0–TP23 to which the network station is connected. When an input port, for example port RP0, receives and stores a packet it sends the network address of the destination station included in the packet to the address mapping system 26 via the mapping bus. The address mapping system returns the identification code (ID) of the output port, for example TP1, to receive the packet. The input and output ports arbitrate for connections. The output ports TP0–TP23 are interconnected to form an output token passing ring. An "output token" is a signal (OUTPUT_TOKEN) that each output port transmits to a next output port of the ring. One output port "passes" the output token to the next by asserting its OUTPUT_ TOKEN signal. The input ports RP0–RP23 are similarly interconnected to from an input token passing ring.

An arbitration sequencer 22 starts an output token passing cycle by transmitting an "output seed" to all output ports TP0-TP23 via the global bus. The output seed is a code identifying a selected one of the output ports as the output seed port. When the output seed port receives the output seed, it determines whether it is idle or busy. An output port considers itself "busy" when it is currently receiving a data packet and considers itself "idle" when it not currently receiving a data packet. If the output seed port is idle it "wins" the right to seek a connection. In such case the winning output port starts an input token passing cycle by sending an "input seed" to all input ports RP0-RP23 via the global bus identifying one of them as the input seed port. The winning output port also sends its own ID to all input ports and to switching system 11 via the global bus.

When the input seed port receives the input seed it determines whether it is currently storing a data packet to be transmitted to the output seed port. If so, the input seed port, having "won" the arbitration, sends its ID code via the global bus to the output ports, the switching system 11 and sequencer 22. Sequencer 22 upon receiving the winning input port ID transmits a write enable (WE) signal to switching system 11. Switching system 11, having received the ID's of winning input and output ports responds to the WE signal by establishing a connection between them. The winning output port, having received the ID of the winning input port, henceforth considers itself busy. After pulsing the WE signal, arbitration sequencer 22 forwards the winning input port ID via a response line (RESP) of the global bus to all input ports RP0-RP23. This tells the winning input port that it may begin transmitting the data packet through switching system 11 to the winning output port.

If the input seed port is not storing a packet to send to the seed output port when it receives the input seed, the input seed port passes the input token to the next input port. If that input port has a packet to send to the seed output port, it wins the arbitration and transmits its ID via the global bus to all output ports, to switching system 11 and to sequencer 22 in order to establish a connection to the output seed port. Otherwise the input token holder passes the input token to the next input port. The input token passing cycle continues until an input port wins the arbitration or until the input token makes its way around the token passing ring and returns to the input seed port. In that case, the input seed port transmits an end of cycle ("EOC") code to the output seed port telling it that no input port has a packet to be sent. On receipt of the EOC code, or upon receipt of a valid input port ID indicating a connection has been made, the output token holder passes the output token to the next output port.

If the output token holder is busy, it immediately passes the output token to a next output port of the ring without starting an input token passing cycle. If the output token holder is idle, it initiates a new input token passing cycle by sending its own ID and an input seed to all input ports RP0-RP23. The input ports, starting with the input seed port, then pass the input token as described above until an input port wins the arbitration or until the input seed port sends an EOC code back to the output token holder. In either case the output token holder passes the output token to the next output port which thereupon initiates yet another input token passing cycle. The process continues with each output port in turn receiving the output token and, if idle, starting an input token passing cycle in an attempt to find an input port with a packet destined for the output port.

When the output token returns to the output seed port, it sends an EOC code to the arbitration sequencer 22 indicating that the output token passing cycle has come to an end.

The arbitration sequencer 22 thereafter starts a next token passing cycle by sending another output seed to the output ports TP0-TP23.

As should be apparent from the foregoing discussion, the output seed port has the highest priority for obtaining a connection during an output token passing cycle because it has the first chance to initiate an input token passing cycle. To ensure all output ports have equal opportunity to establish connections over the long term, arbitration sequencer 22 starts each successive output token passing cycle by choosing a next successive one of the output ports TP0-TP23 as the output seed. Similarly, the input seed port has the highest priority for obtaining a connection to the current output token holder during an input token passing cycle, because the input seed port has the first opportunity to make the connection. Thus to ensure that all input ports are treated equally over the long term, each output port chooses a next successive one of the input ports RP0-RP23 as the input seed port each time the output port starts an input token passing cycle.

Figure 2:
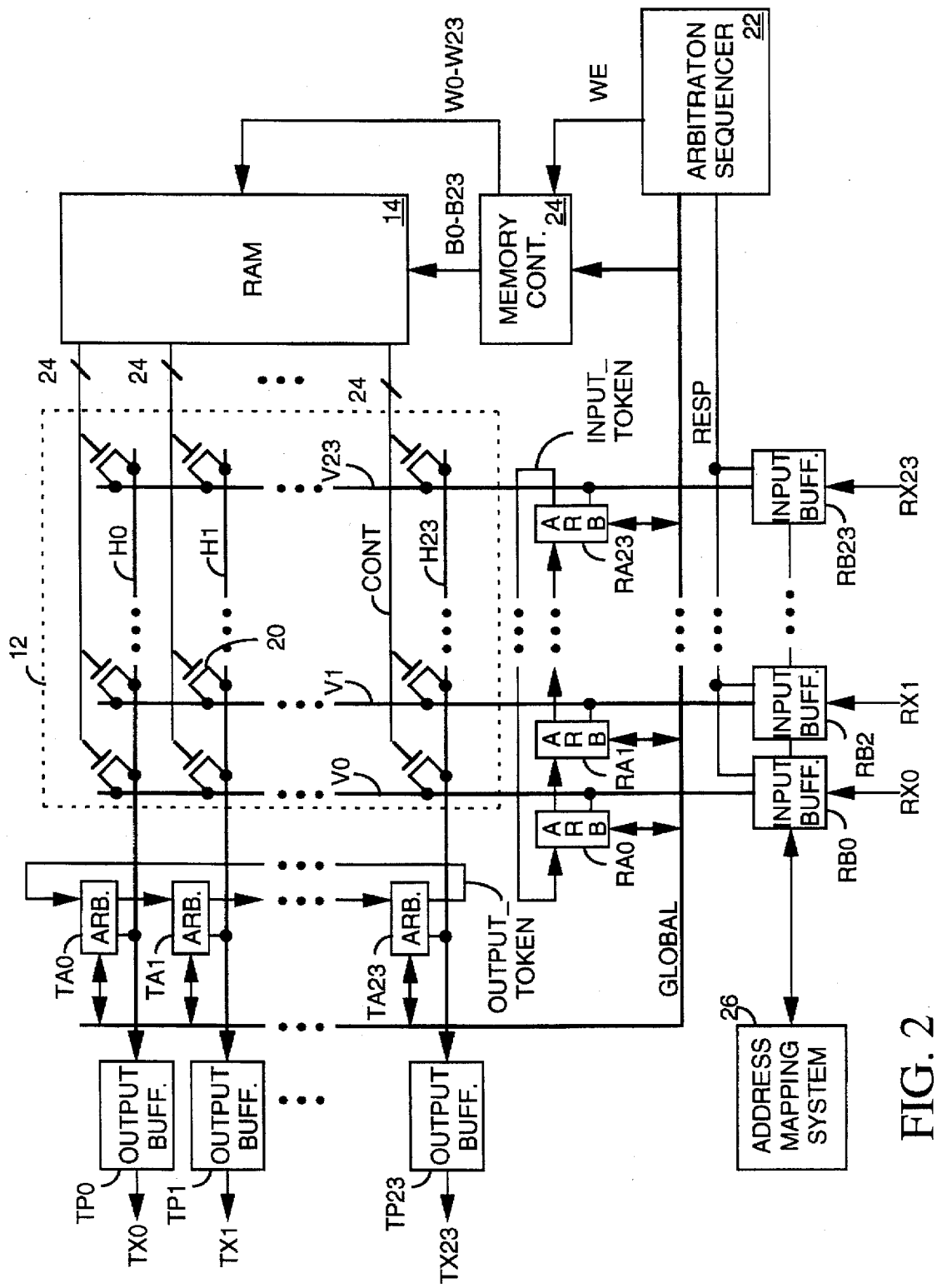

FIG. 2 illustrates the local area network switch 10 of FIG. 1 in more detailed block diagram form. Input port RP0 of FIG. 1 includes an input arbiter RA0 and an input buffer RB0 as illustrated in FIG. 2. The input buffer RB0 receives and stores packets arriving on line TX0 and later forwards them on line V0. Output port TP0 of FIG. 1 includes an output arbiter TA0 and an output buffer TB0 shown in FIG. 2. Output buffer TB0 receives and stores packets arriving on line H0 and forwards them to a network station via line RX0. Input ports RP1-RP23 and output ports TP1-TP23 have similar buffer and arbiter components. All input arbiters RA0-RA23 form the input token passing ring and all output arbiters TA0-TA23 form the output token passing ring. The global bus interconnects all arbiters with the arbitration sequencer 22.

Switching system 11 of FIG. 1 includes a crosspoint switch 12, a random access memory (RAM) 14 and a memory controller 24. Crosspoint switch 12 includes an array of CMOS pass transistors 20, each having source and drain terminals connected to one of horizontal lines H0-H23 and to one of vertical lines V0-V23. RAM 14 stores 24 24-bit words and supplies a separate control signal CONT to the gate of each transistor 20. When a CONT signal is asserted, it turns on a pass transistor 20, thereby establishing a signal path between one horizontal and one vertical line. The state of each CONT signal supplied to a transistor 20 of the Jth row of transistors 20 is determined by a corresponding bit of a Jth data word stored in RAM 14. Upon receipt of the write enable (WE) pulse from sequencer 22, memory controller 24 writes a selected 24-bit word into RAM 14 by placing the word on bit lines B0-B23 and pulses one of word lines W0-W23. When writing a word to RAM 14, controller 24 sets all but one of bits B0-B23 to a logical "0" and sets the remaining bit to a logical "1". Controller 24 chooses the bit to be set to a "1" in response to the winning input port ID appearing on the global bus and selects the word line W0-W23 to be pulsed in response to the winning output port ID appearing on the global bus. When the bit set to a "1" arrives in RAM 14, it asserts the CONT signal supplied to a corresponding transistor 20. That transistor then makes the connection between horizontal and vertical lines leading to the winning input and output ports.

When an input buffer, for example RB0, receives and stores a packet arriving on RX0, it checks the address data in the packet and communicates with mapping system 26 via the mapping bus to determine which output buffer, for example TB1 should receive the packet. Input buffer RB0 then transmits a connection request to input arbiter RA0 via line V0, the connection request identifying the output buffer TB1. As described below, the input ports encode inaction requests and data packets so that the input arbiter can distinguish between them and can tell when they begin and end. When input arbiter RA0 detects a connection request on line V0, it saves the output buffer (TB1) ID included in the connection request and thereafter arbitrates for a connection to output buffer TB1.

The 24 output arbiters TA0–TA23 monitor data packets traveling on corresponding horizontal conductors H0–H23 to output buffers TB0–TB23. When the connection to output port TP1 is established, output arbiter TA1 sets an internal "IDLE" flag to indicate that port TP1 is now busy receiving a data packet. When it detects the end of the data packet appearing on line H1, output arbiter TA1 resets its internal IDLE flag to indicate port TP1 is idle. As discussed below, each output arbiter TA0–TA23 consults its IDLE flag during the arbitration process to determine whether its port TP0–TP23 is idle and therefore available for a new connection.

Input Buffer

Figure 3:
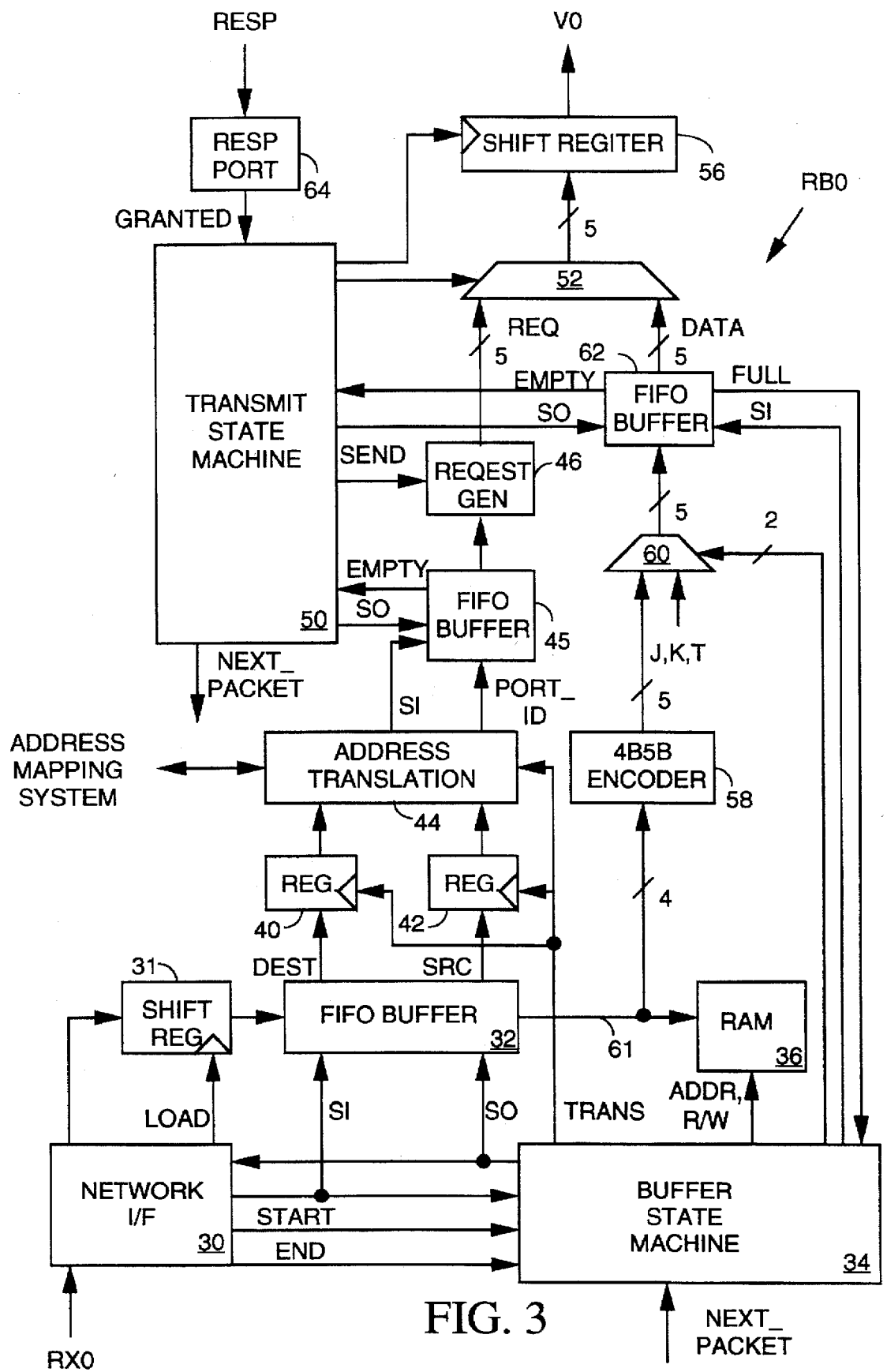
FIG. 3 illustrates input buffer RB0 of FIG. 2 in more detailed block diagram form.

FIG. 3 illustrates input buffer RB0 of FIG. 2 in more detailed block diagram form. Input buffers RB1–RB23 are similar. A network station transmits a data packet to input buffer RB0 in serial form via bus RX0 using Ethernet 10BASE-T protocol. The data packet, formatted as a standard Ethernet protocol data unit, is of variable length and includes the fields illustrated in Table I:

TABLE I

| Field | Field Length | Purpose |
|---|---|---|
| PREAMBLE | 7 bytes | Used for synchronizing |
| START | 1 byte | Start of frame delimiter |
| DEST | 6 bytes | Destination Network address |
| SRC | 6 bytes | Source Network address |
| TYPE/LEN | 2 bytes | Type or Length of data field |
| DATA | 46–1500 bytes | Data field |
| CRC | 4 bytes | Frame check field |

The PREAMBLE and START fields are fixed data patterns that are the same for all packets. The DEST field indicates the network address of the station to receive the packet. The SRC field indicates the network address of the station that transmitted the packet. The TYPE/LEN fields may indicate either the packet type or the length of the DATA field, depending on the protocol being employed. The DATA field holds the packet payload data and may be from 46 to 1500 bytes long. The CRC field is a frame check field used by the receiving station to determine whether the packet has been corrupted in transmission. Referring to FIG. 3, a convention 10BASE-T network interface circuit 30 receives the incoming packet arriving on input bus RX0. A carrier signal conveyed on the bus indicates the beginning and end of packet transmission. As each bit of a data packet arrives, the network interface circuit 30 pulses a LOAD signal to store the bit in a 4-bit serial-in/parallel out shift register 31. When the first 4-bit "nibble" (half byte) of the data packet following the preamble has been loaded into register 31, interface circuit 30 asserts a shift-in (SI) signal to a first-in/first-out (FIFO) buffer 32, causing the FIFO buffer to store the nibble. Interface circuit 30 continues to load each successive nibble of the data packet into buffer 32.

When the longest stored nibble in FIFO buffer 32 is the first nibble of a data packet following the preamble, network interface circuit 30 transmits a START signal to a buffer state machine 34. Buffer state machine 34 controls the storage of data packets in a buffer memory, random access memory (RAM) 36. On receipt of the START signal, buffer state machine 34 begins pulsing a shift-out signal (SO), each pulse causing FIFO buffer 32 to shift a 4-bit data nibble out to RAM 36 via a 4-bit data bus 61. RAM 36, controlled by address and read/write control signals generated by buffer state machine 34, stores the packet data nibbles at sequential addresses. Network interface circuit 30 counts the nibbles of each packet it loads into FIFO buffer 32 and also counts pulses of the SO signal produced by buffer state machine 34 to determine how many nibbles of the state machine 34 has stored in RAM 36. After interface circuit 30 shifts the last nibble of a packet into FIFO buffer 32, it continues to count the number of nibbles the buffer state machine 34 shifts out of buffer 32 and sends an END signal to state machine 34 to tell it that it has acquired the last nibble of the packet. Buffer state machine 34 also counts nibbles of incoming packet data as they are stored in RAM 36. After receiving the END signal from network interface 30, state machine 34 stores its count in RAM 36 as a LENGTH field in a header portion of the packet. When the packet is later forwarded to an output buffer, the output buffer determines the length of the packet from the LENGTH field.

As it loads packet data into RAM 36, buffer state machine 34 determines from its nibble count when the data packet's source and destination fields (SRC, DEST) appear in FIFO buffer 32. At that point buffer state machine 34 generates a translate signal (TRANS) causing a pair of registers 40 and 42 to store the SRC and DEST fields. The TRANS signal also signals an address translation circuit 44 that new address data is available in registers 40 and 42. The address translation circuit 44 sends an interrupt signal to central address mapping system 26 of FIG. 2. The address mapping system maintains a table for translating network addresses into switch input/output port IDs. On receiving the interrupt, the address mapping system obtains the SRC and DEST fields from translation circuit 44 as well as the ID of output buffer TB0. (The source network station that sent the packet via buffer RB0 should also be connected to input buffer TB0 for receiving network transmissions.) The address mapping system then updates its mapping table to map the SRC field address to output buffer TB0. The mapping system uses this mapping later when any other network station sends a packet to the source station connected to buffer TB0.

The address mapping system also translates the DEST field acquired from address translation circuit 44 into the ID of the output buffer to which the destination station is connected and returns the output port ID to translation circuit 44. Translation circuit 44 then delivers the output port ID (PORT_ID) to a FIFO buffer 45. The longest stored PORT_ID in FIFO buffer 45 is supplied to a connection request generator circuit 46. FIFO buffer 45 asserts an EMPTY signal to a transmit state machine 50 when is empty and de-asserts it when it stores a port ID. Transmit sequencer 50 controls the flow of connection requests and data packets outward from input buffer RB0 on conductor V0 to input arbiter RA0 and switch 12 of FIG. 2. Sequencer 50 receives a GRANTED signal from a response buffer 64. Response buffer 64 monitors the RESP line of the global bus from arbitration sequencer 22 of FIG. 2. As mentioned above, whenever sequencer 22 of FIG. 2 grants a connection request, it transmits a response on the RESP line, the response indicting the ID of the input buffer that requested the connection. When response buffer 63 detects a response conveying the ID of input port RP0, it pulses the GRANTED signal. The GRANTED signal pulse tells sequencer 50 that the last connection request made by buffer RB0 has been granted and that it is free to issue a next connection request.

If FIFO buffer 45 is not empty, a connection request is pending. After receiving a GRANTED pulse (or after system start- up) sequencer 50 monitors an EMPTY signal asserted by FIFO buffer 45 when buffer 45 contains no port ID's. When it sees that the EMPTY signal is de-asserted, indicating a request is pending, sequencer 45 begins pulsing a SEND signal causing the request generator 46 to produce a connection request REQ in the form of a sequence of 5-bit of data values which pass through multiplexer 52 to a shift register 56. The connection request references the output port ID longest stored in FIFO buffer 45. Shift register 56 converts the sequence of 5-bit data values to a serial data stream and forwards it on line V0 to the input arbiter TA0 of FIG. 2. Sequencer 50 then pulses a shift-out signal to FIFO buffer 45 telling it to shift out the next port ID, if any, to request generator 46.

When state machine 50 receives a GRANTED signal pulse it transmits a NEXT_PACKET signal to buffer state machine 34 telling it it may begin forwarding a next packet. Buffer state machine 34 then switches a multiplexer 60 to receive a hardwired 5-bit code "J". Sequencer 34 then shifts the "J" code output of multiplexer 60 into a FIFO buffer 62, switches multiplexer 60 to select a hardwired "K" code and shifts the "K" code output of multiplexer 60 into a FIFO buffer 62. (As explained below, the JK code sequence marks the beginning of a data packet transmission on output line V0.) Thereafter, state machine 34 switches multiplexer 60 to select the 5-bit data output of an encoder circuit 58 which converts the 4-bit data appearing on data input/output bus 61 of RAM 36 to 5-bit "4B5B" encoded form. Sequencer 34 then begins sequentially reading 4-bit nibbles of the data packet out of RAM 36. As encoder 58 converts the nibbles to 5-bit 4B5B encoded form, multiplexer 60 passes the 5-bit result to a FIFO buffer 62. Sequencer 34 strobes a shift in (SI) signal causing FIFO buffer 62 to load the 5-bit data values. FIFO buffer 62 produces a FULL signal telling state machine 34 when the buffer is full. The longest stored nibble in FIFO buffer 62 appears at an input of multiplexer 52 controlled by the transmit sequencer 50. When packet data is currently stored in FIFO buffer 62, buffer 62 de-asserts an EMPTY signal supplied to sequencer 50. When sequencer 50 is not currently sending a connection request, it switches multiplexer 52 to deliver the 5-bit output of FIFO buffer 62 to shift register 56. State machine 50 then signals shift register 56 to convert the 5-bit value to serial form and to forward the data on line V0 to switch 12 of FIG. 2. Switch 12 routes the data to the appropriate output buffer.

As buffer state machine 34 forwards packet data out of RAM 36 to FIFO buffer 62 it counts the nibbles sent and compares the count to the known length of the packet. After it forwards the last nibble of the packet through encoder 58 to FIFO buffer 62, state machine 34 switches multiplexer 60 to select and forward to FIFO buffer 62 a 5-bit hardwired "T" code. This code, which marks the end of the packet, passes through in FIFO buffer 62, multiplexer 52 and serializer 56 and travels out on line V0 at the end of the data packet.

When the last bit of nibble of a packet departs FIFO buffer 62, it signals state machine 50 that it is empty. State machine 50 then waits for another GRANTED signal pulse indicating that a next connection request has been established. It then signals state machine 34 with a NEXT_PACKET signal pulse indicating that it may send out another packet.

Note that whenever transmit sequencer 50 is ready to send a connection request out on line V0, it simply halts any current flow of packet data outward on line V0, forwards the connection request out on V0, and then resumes the flow of packet data. Thus a connection request may appear in the middle of a data packet flowing from input buffer RB0 to one of output buffers TB1–TB23. The receiving output buffer recognizes and removes any connection requests from the data stream before forwarding them to the destination network station. Connection requests are thus forwarded to the input arbiter RA0 while input buffer PB0 is still busy forwarding a data packet so that the arbiter can immediately begin seeking the connection request as soon as possible after the packet currently being forwarded leaves the input buffer.

4B5B Encoding

Connection requests and data packets are transmitted on the same output line V0 primarily to reduce the number of inter- module links since the input buffer and input arbiter portions of the input port may be implemented on separate integrated circuits. The input arbiter in any case monitors the V0 line to ascertain when a packet transmission ends. Connection requests and data packets are "4B5B" encoded to enable the input and output arbiters and the output buffers to determine when connection requests and data packets begin and end. Consistent with the ANSI standard X379 (FDDI) "4B5B" encoding system, encoder 54 converts each incoming 4-bit nibble into a 5-bit output value as illustrated in Table II.

TABLE II

| NIBBLE | 4B5B |
|--------|-------|
| 0000 | 11110 |
| 0001 | 01001 |
| 0010 | 10100 |
| 0011 | 10101 |
| 0100 | 01010 |
| 0101 | 01011 |
| 0110 | 01110 |
| 0111 | 01111 |
| 1000 | 10010 |
| 1001 | 10011 |
| 1010 | 10110 |
| 1011 | 10111 |
| 1100 | 11010 |
| 1101 | 11011 |
| 1110 | 11100 |
| 1111 | 11101 |

Since only 16 of the 32 possible combinations of the five bits of a 4B5B code are needed to represent the sixteen possible values of a 4-bit nibble, the remaining 16 combinations of 4B5B code are available for other purposes. Table III below lists how the network switch of the present invention uses the remaining 16 4B5B codes.

TABLE III

| 4B5B | NAME | FUNCTION |
|-------|------|----------|
| 00000 | Q | No Operation |
| 11111 | I | Idle |
| 00100 | H | No Operation |
| 11000 | J | Packet Start 1 |
| 10001 | K | Packet Start 2 |
| 01101 | T | End of Packet |
| 00111 | R | No Operation |
| 11001 | S | No Operation |
| 00001 | V | Violation |
| 00011 | V | Violation |
| 00010 | V | Violation |
| 00101 | V | Violation |
| 00110 | V | Violation |
| 01000 | V | Violation |
| 01100 | V | Violation |
| 10000 | CR | Con. Req. Start |

The CR code is used to identify the start of a connection request. The Q, H, R and S codes are ignored when they appear in a 4B5B encoded data stream. The T code indicates the end of a 4B5B encoded data packet. The I, J, K and V codes are used to synchronize transmission and receipt of 4B5B encoded data streams in the manner described below.

Output Buffer

Figure 4:
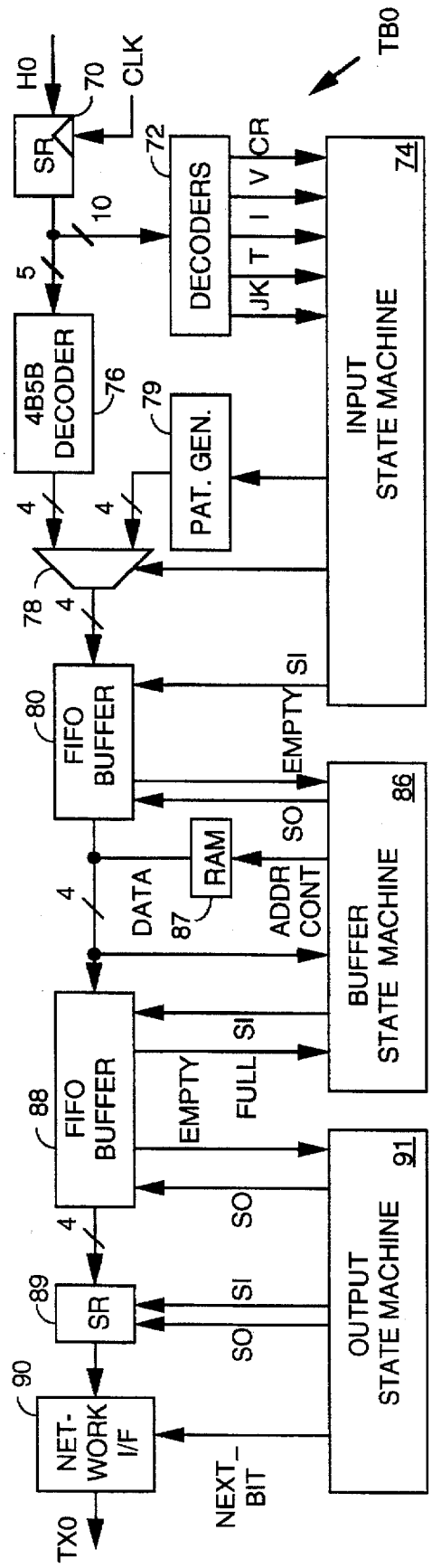
FIG. 4 illustrates output buffer TB0 of FIG. 2 in more detailed block diagram form.

FIG. 4 illustrates output buffer TB0 of FIG. 2 in more detailed block diagram form. Output buffers TB1–TB23 are similar. Output buffer TB0 includes a 10-bit serial-in, parallel-out shift register 70 clocked by the system clock signal CLK for receiving and storing data bits appearing on the H0 line. A set of decoders 72 signal an input sequencer 74 when first five data bits stored in shift register 70 represent the I,V, T or CR 4B5B codes of Table II above or when all ten bits in shift register 70 represent the J and K codes in succession. A 4B5B decoder 76 converts the second stored 5-bit value into the corresponding 4-bit nibble and passes it via a multiplexer 78 to the input of a FIFO buffer 80.

Figure 5:
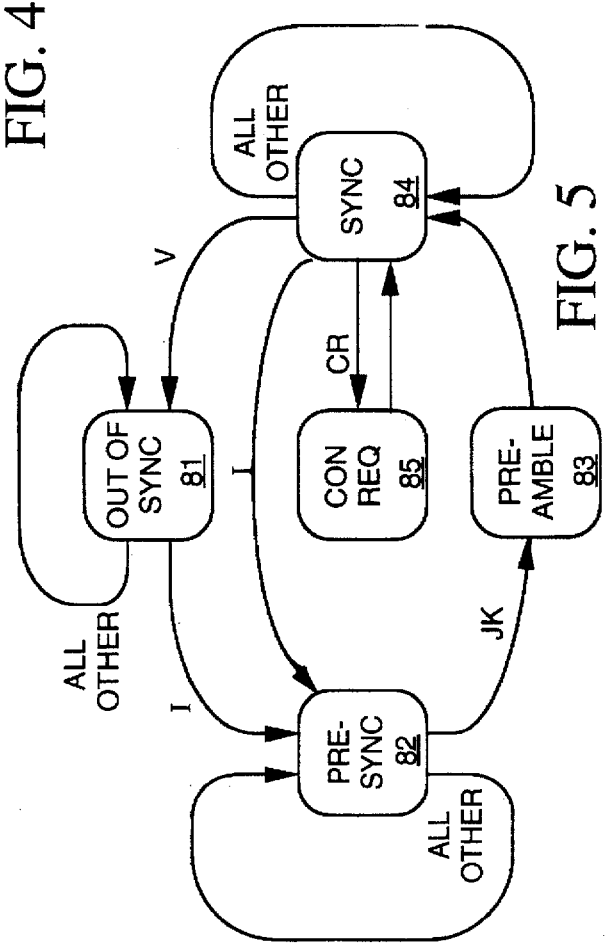
FIG. 5 is state diagram illustrating a synchronization process carried out by input sequencer 74 of FIG. 4.

FIG. 5 is state diagram illustrating a synchronization process carried out by input sequencer 74 of FIG. 4. Input sequencer 74 begins in an "out-of-synchronization" state 81. Sequencer 74 remains in state 81 until decoder 72 detects the I (idle) signal. At that point synchronizer 74 moves to a "pre-synchronization" state 82. When decoder 72 signals detection of successive J and K symbols (indicating start of a data packet) synchronizer 74 switches to a "load pattern" state 83 wherein it switch multiplexer 78 to select the output of a pattern generator 79. Pattern generator 79 produces the network protocol PREAMBLE field for the data packet, which is the same for all data packets. As pattern generator 79 produces the PREAMBLE field, sequencer 70 shifts it into FIFO buffer 80. Thereafter, sequencer 74 switches multiplexer 78 to select the output of decoder 76, It then moves to state 84 of FIG. 5 wherein asserts an SI signal on every 5th pulse of the system clock signal. If decoder 72 detects the I code while sequencer 74 reverts to its pre-synchronization state 82. If decoder 72 detects the V code sequencer 74 reverts to out-of-synchronization state 106. If decoder 72 detects the CR code (indicating start of a connection request) while sequencer 74 is in state 84, the sequencer moves to a "connection request" state 85. State 85 is similar to state 84 except that in state 85 sequencer 74 does not shift the output of decoder 76 into FIFO buffer 80. Sequencer 74 remains in state 112 for the number of system clock cycles required for the connection request to pass through shift register 70. The sequencer 74 then reverts to state 84 to resume processing the data packet.

Referring again to FIG. 4, when FIFO buffer 80 signals it is not empty, a buffer state machine 86 shifts data out of FIFO buffer 80 onto a 4-bit data input/output bus of a random access memory (RAM) 87. State machine 82 then supplies address and control signals to RAM 87 causing it to store the 4-bit nibble in RAM 86. State machine 86 uses RAM 87 as a large FIFO buffer for assembling and storing each data packet until it can be transmitted outward to the destination station. As each data packet arrives, state machine 86 checks its LENGTH field to determine the length of the packet. When the packet is fully assembled state machine 86 reads each successive nibble of the packet out of RAM 87 and shifts it into a FIFO buffer 88, bypassing the LENGTH field. State machine 86 monitors a FULL signal produced by FIFO buffer 88 and suspends loading data into buffer 88 when it is full. The longest stored nibble in FIFO buffer 88 is supplied to a 4-bit parallel-in/serial-out shift register 89. The serial output of shift register 89 passes to a conventional network interface circuit 90 which forwards each bit to the receiving network station via the TX0 bus. When it forwards a bit to the TX0 bus, interface circuit 90 signals an output state machine 91 and state machine 91 signals shift register 89 to shift out a bit. When a 4-bit nibble has been shifted out of register 89, state machine 91 checks an EMPTY signal produced by FIFO buffer 88. If FIFO buffer 88 is not empty, state machine 91 shifts a next nibble of the packet out of FIFO buffer 88 and shifts it into shift register 89.

MEMORY CONTROLLER

Figure 6:
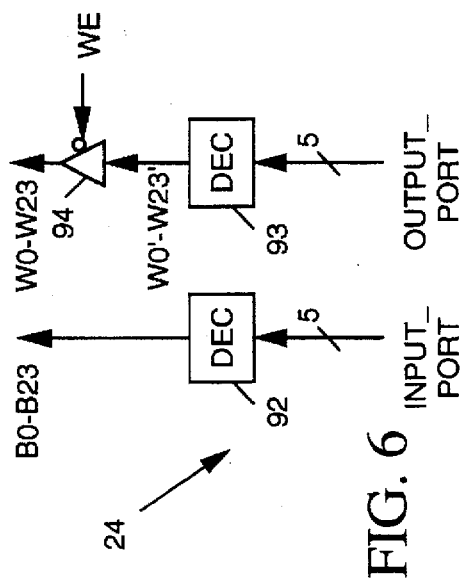
FIG. 6 illustrates memory controller 24 of FIG. 2 in more detailed block diagram.

FIG. 6 illustrates memory controller 24 of FIG. 2 in more detailed block diagram. Memory controller 24 includes a pair of decoders 92 and 93 and a set of tri-state buffers 94. Decoders 92 and 93 receive the 5-bit INPUT_PORT and OUTPUT_PORT IDs from the winning input and output port via the global bus. Decoder 92 produces 24 output bits B0–B23 supplied to RAM 14 of FIG. 2. Decoder 92 sets all bits B0–B23 to a logical "0" except one particular bit referenced by the INPUT_PORT ID. Decoder 92 sets that bit to a logical "1". Decoder 93 also produces 24 output bits W0'–W23', setting all of them to a logical "0" except one particular bit referenced by the OUTPUT_PORT ID. Decoder 93 sets that bit to a logical "1". Tri-state buffers 94 connect the W0'–W23' signals to word lines W0–W23 of RAM 14 of FIG. 2. A pulse of the WE signal from arbitration sequencer 22 of FIG. 2 briefly enables tri-state buffers 94 causing a pulse to appear on one of word line W0–W23 corresponding to the particular one of bits W0'–W23' set to a logical "1". RAM 14 of FIG. 2 responds to the pulse by storing the 24 data bits B0–B23 at a row corresponding to the pulsed word line. Since only one of bits B0–B23 is a logical "1", switch 12 of FIG. 2 makes only one connection to the output buffer corresponding to the row and breaks any other connections to that buffer.

ADDRESS TRANSLATION

Figure 7:
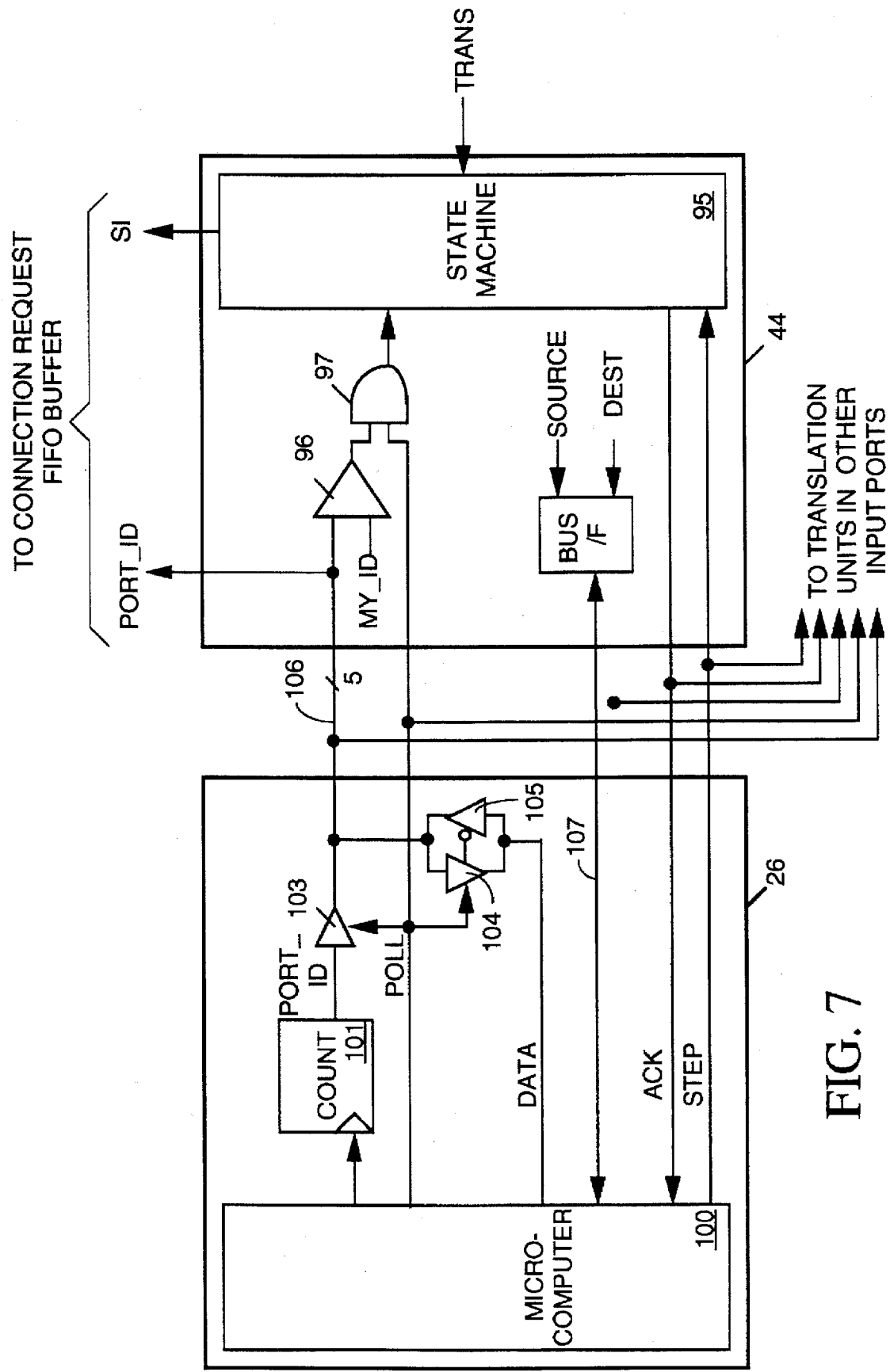
FIG. 7 illustrates the address mapping system 26 of FIG. 1 and address translation unit 44 of FIG. 3 in more detailed block diagram form.

FIG. 7 illustrates the address mapping system 26 of FIG. 2 and address translation unit 44 of FIG. 3 in more detailed block diagram form. Address translation unit 44 includes a state machine 95, a comparator 96, an AND gate 97 and a bus interface circuit 98. Address mapping system 26 includes a microcomputer 100, a counter 101 and a set of tri-state buffers 103–105.

FIG. 8 is a flow chart illustrating operation of microcomputer 100 and FIG. 9 is a flow chart illustrating operation of state machine 95. Referring to FIGS. 3 7, 8 and 9, when 48-bit destination (DEST) and source (SOURCE) address fields have been stored in registers 40 and 42 (FIG. 3), buffer state machine 34 signals address translation unit 44 by pulsing a TRANS signal. Address mapping system 26 continuously polls the address translation unit 44 to determine if the translation unit has a pending translation request. Counter 101 produces an output count indicating the ID of the buffer being polled (PORT_ID).

Following system start up, microcomputer 100 asserts a POLL output signal (step 108). The POLL signal enables buffers 103 and 104 which send the PORT_ID of counter 101 via lines 106 to an input of a comparator 96 within each translation unit 44. The ID of the input buffer in which each translation unit 44 resides (MY_ID) is applied to a second input of comparator 96. When PORT_ID matches MY_ID, comparator 96 asserts its output signal. The comparator 96 output signal and the POLL signal produced by microcomputer 100 are supplied to inputs of AND gate 97. Thus AND gate 97 asserts its output when buffer MY_ID is being polled.

After asserting the POLL signal (step 108), microcomputer 100 looks for an acknowledge (ACK) signal input from one of the translation units 44 (step 109) indicating the unit 44 has a pending translation request. If microcomputer 100 does not detect an ACK signal pulse (step 109) it pulses a NEXT signal which clocks counter 101 (step 110). Counter 101 then increments the value of PORT_ID. That new PORT_ID value is sent to the translation units (step 108) and microcomputer 100 looks for an ACK pulse in response (step 109). Microcomputer 100 continues to cycle through steps 108–110 polling each buffer in turn until it obtains an ACK response at step 109 from a polled translation unit 44 having a pending translation. The ACK signal pulse tells microcomputer 100 to read the SOURCE data field from register 40 via bus lines 107 and bus interface circuit 98 (step 111) and to create a table entry relating the port ID output of counter 101 to the incoming network SOURCE address (112). Thereafter, microcomputer 100 turns off its POLL signal (step 113) to disable buffers 103 and 104 and to enable buffer 105. Microcomputer 100 then reads the destination DEST data field from register 42 via bus lines 107 and bus interface circuit 98 (step 114). Thereafter it accesses its internal lookup-table to determine the corresponding output port ID, places the output port (PORT_ID) on lines 106 (step 116), sends a STEP signal pulse to state machine 95 (step 116) and then waits for an ACK signal pulse (step 117). It then starts another polling cycle by pulsing the NEXT signal (step 110), turning on the POLL signal (step 108) and then looking for another ACK response (step 109).

Following system startup, state machine 95 waits for a TRANS signal pulse (step 118) indicating that new SOURCE and DEST fields are available in registers 40 and 42 (FIG. 3) It then waits until the output of AND gate 97 indicates it is being polled (step 119). It then sends an ACK signal pulse to microcomputer 100 (step 120) and awaits a STEP signal pulse indicating the DEST field has been translated an that the corresponding output PORT_ID is ready on lines 106 (step 125). On receipt of the STEP signal pulse, state machine 95 pulses the shift in (SI) input signal to FIFO buffer 45 of FIG. 3 (step 126) which stores the port ID appearing on data bus 106 for subsequent use in a connection request. Thereafter state machine 95 pulses the ACK signal (step 127) and returns to step 118 where it waits for another translation request.

ARBITRATION

In a preferred embodiment of the invention, as illustrated in FIGS. 10–15, LAN switch 10 of FIG. 2 employs "output polling" arbitration. In an alternative embodiment of the invention, as illustrated in FIGS. 16–22 LAN switch 10 of FIG. 2 employs "event driven" arbitration. In both systems the arbitration sequencer 22 initiates each output token passing cycle. Also in both systems, each idle output arbiter, upon receiving an output token, initiates an input token passing cycle in an attempt to establish a connection to an input port. In the output polling arbitration system, sequencer 22 initiates an output token passing cycle upon system start up and starts a new output token passing cycle whenever a previous output token passing cycle ends. However, in the event driven arbitration system, arbitration sequencer 22 starts an output token passing cycle only when an input arbiter RA0–RA23 signals sequencer 22 that it has a new connection request or when an output arbiters TA0–TA23 signals that its port has become newly idle. The input and output arbiters RA0–RA23 and TA0–TA23 and the arbitration sequencer 22 of FIG. 2 differ in some respects for the two types of arbitration systems.

Output Arbiter—Output Polling

Figure 10:
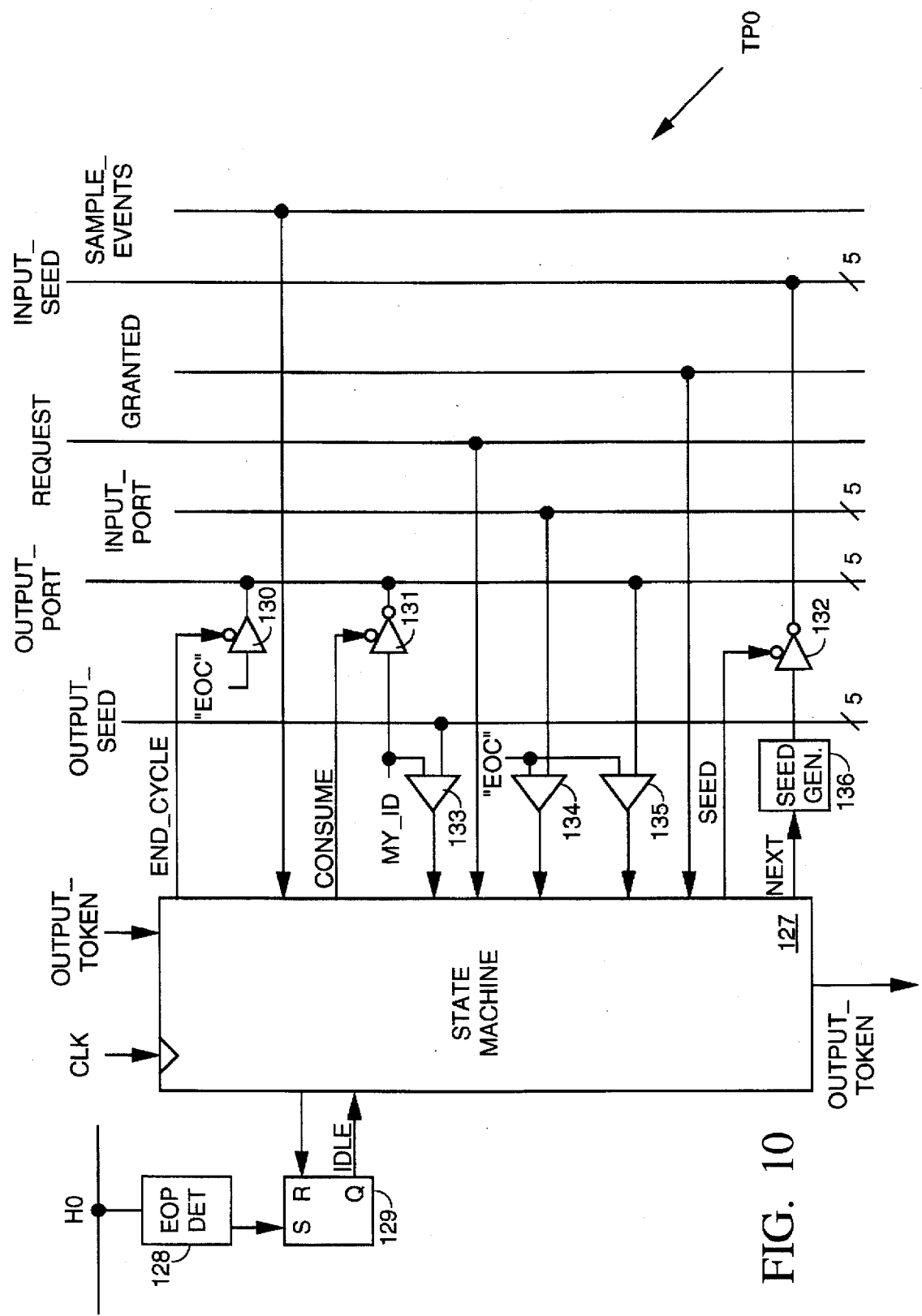
FIG. 10 illustrates an output polling version of output arbiter RA0 of FIG. 2 in more detailed block diagram form.

FIG. 10 illustrates an output arbiter RA0 of FIG. 2 for use in the output polling system in more detailed block diagram form. The global bus of FIG. 2 which interconnects the input and output arbiters and the arbitration sequencer 22 includes 24 lines conveying eight data values or control signals as illustrated in Table IV.

TABLE IV

| VALUE/SIGNAL | LINES | PURPOSE |
| --- | --- | --- |
| CLK | 1 | Global clock |
| INPUT_SEED | 5 | Input seed ID |
| OUTPUT_SEED | 5 | Output seed ID |
| INPUT_PORT | 5 | Input token holder ID |
| OUTPUT_PORT | 5 | Output token holder ID |
| REQUEST | 1 | Connection Request |
| SAMPLE_EVENTS | 1 | Starts token passing cycle |
| GRANTED | 1 | Indicates connection granted |

Output arbiter TA0 includes a state machine 127 clocked by the system clock (CLK) for controlling arbiter operation. Arbiter TA0 also includes an end-of-packet (EOP) detection circuit 128 for detecting the end of a data packet appearing on horizontal line H0 of switch 12 (FIG. 2). The Q output of a flip-flop 129, supplied as an IDLE signal to state machine 127, indicates when the port is idle. Detection circuit 128 sets flip-flop 129 when it detects the end of a packet. State machine 127 resets the flip-flop whenever a connection to the port has been granted. Output arbiter TD0 also includes a set of three tri-state buffers 130–132, a set of comparators 133–135 and an "input seed generator" circuit 136. Comparator 133 asserts its output signal when an output port ID appearing on the OUTPUT_SEED lines matches MY_ID, the ID of output port TP0. Comparator 134 asserts its output signal when data appearing on the INPUT_PORT lines matches an end-of-cycle (EOC) code. Comparator 135 asserts its output signal when an output port ID appearing on the OUTPUT_PORT lines matches MY_ID.

Figure 11:
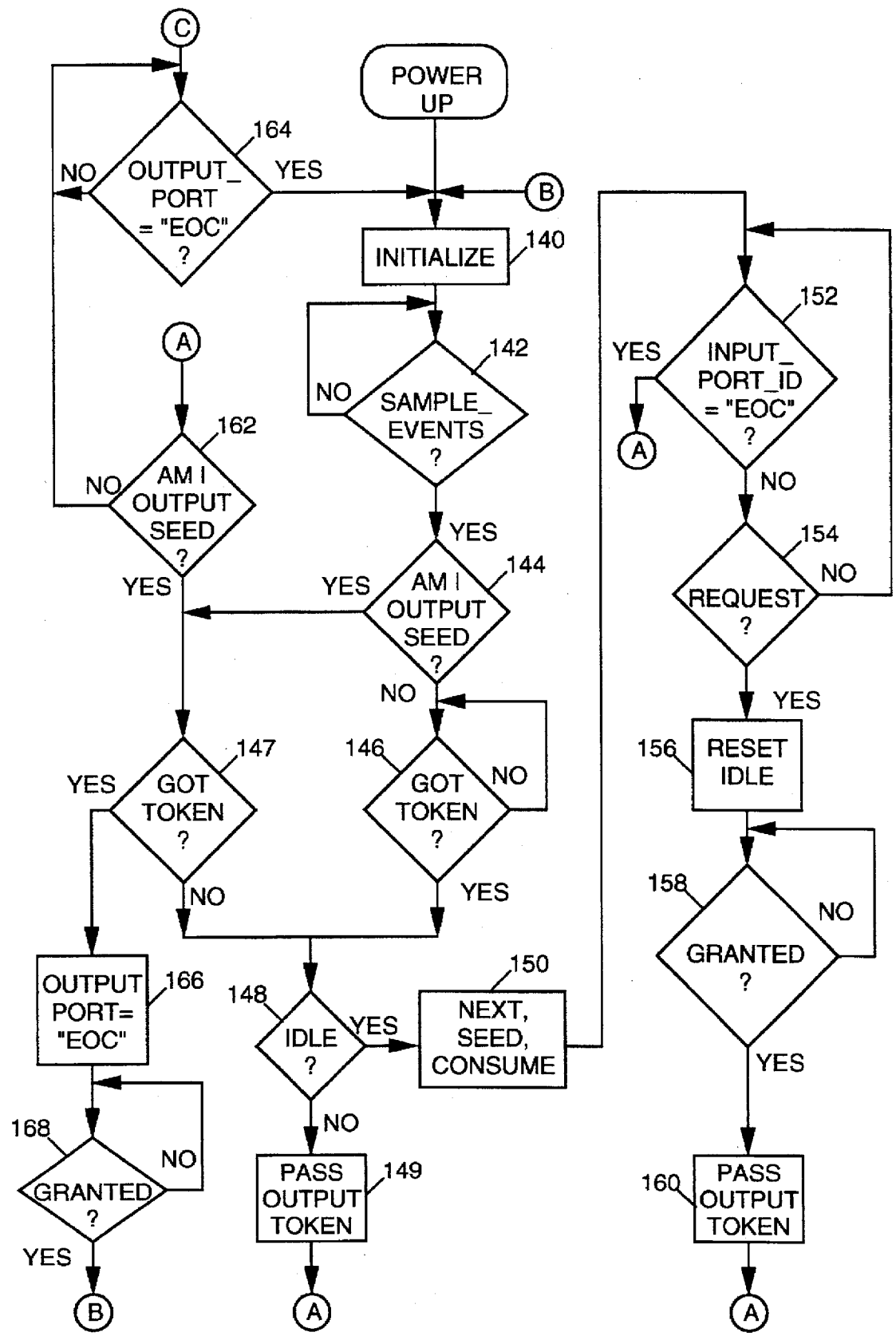
FIG. 11 is a flow chart illustrating operation of state machine 120 of FIG. 10.

FIG. 11 is a flow chart illustrating operation of state machine 127 of FIG. 10. Referring to FIGS. 10 and 11, on system power up, state machine 127 initializes itself (step 140). During step 140, state machine 127 de-asserts its OUTPUT_TOKEN signal supplied to the next output arbiter. State machine 127 also sets three output signals END_CYCLE, CONSUME and SEED to turn off the three tri-state buffers 130–132 and pulses the CLEAR output signal to reset flip-flop 128. State machine 127 then awaits a pulse on the SAMPLE_EVENTS line (step 142).

To start a token passing cycle, central arbitration sequencer 22 (FIG. 2) places the ID of one of the output ports on the OUTPUT_SEED lines and then signals the start of the output token passing cycle by pulsing the SAMPLE_EVENTS line. On detecting the SAMPLE_EVENTS pulse, state machine 127 determines whether its output port is the output seed by looking at the output of comparator 133 (step 144). As shown in FIG. 10, comparator 133 compares the output port's ID (MY_ID) with the port ID conveyed on the OUTPUT_SEED lines and signals state machine 127 with the comparison result. If output port TP0 is not the output seed, then state machine 127 waits (step 146) until it has received the output token (i.e. its input OUTPUT_TOKEN signal is asserted) and then moves to step 148. Otherwise if output port TP0 is the output seed and has not received the output token (step 147), sate machine 127 moves directly to step 148.

At step 148 state machine 127 checks its IDLE input signal to determine whether its output port TP0 is idle. If port TP0 is not idle, state machine 127 passes the output token to the next output port (step 149). If port TP0 is idle at step 148, state machine 127 pulses a NEXT signal input to seed generator 136 and sets its CONSUME and SEED output signals to turn on tri-state buffers 131 and 132 of FIG.

10 (step 150). When tri-state buffer 131 turns on, it places the ID of output port TP0 (MY_ID) on the OUTPUT_PORT lines. Seed generator 136 contains a rotating table of input port IDs and supplies one of the input port IDs as input to buffer 132. A pulse of the NEXT signal tells seed generator 136 to select a next one of the input port IDs from its rotating table as its output. When tri-state buffer 132 turns on it places the output of SEED generator 136, the ID of one of input ports RP1–RP23, on the INPUT_SEED lines. When a valid ID appears on the INPUT_SEED lines, the input arbiters RA0–RA23 arbitrate for connection to the output port (TP0) whose ID appears on the OUTPUT_PORT lines. If an input arbiter having a pending connection request for output port TP0 wins the arbitration, it places its input port ID on the INPUT_PORT lines and asserts the REQUEST signal line. If no input arbiter has a pending request for output port TP0, the seed input port places an EOC (end-of-cycle) code on the INPUT_PORT lines.

After initiating an input token passing cycle at step 150, state machine 127 cycles through steps 152 and 154 looking for either an EOC code on the INPUT_PORT lines (step 152) or assertion of the REQUEST signal (step 154). If the REQUEST signal is asserted, there is a pending request for port TP0 that is about to be granted. Accordingly state machine 127 resets flip-flop 129 (step 156) to indicate port TP0 is no longer idle and then waits for assertion of the GRANTED signal (step 158). Central arbitration sequencer 22 of FIG. 2 asserts the GRANTED signal when it has established the connection between input and output ports. After the connection has been granted, state machine 127 passes the output token to the next output port (step 160).

After passing the output token at steps 149 or 160, state machine 127 again checks whether port TP0 is the output seed (step 162). If not, state machine 127 waits until the output of comparator 135 indicates that an EOC code appears on the OUTPUT_PORT lines (step 164). The output seed places the EOC code on the OUTPUT_PORT lines to mark the end of the output token passing cycle. At that point state machine 127 re-initializes the output arbitrator (step 140) and then waits (step 142) for a SAMPLE_EVENTS pulse signaling the start of another output token passing cycle.

If state machine 127 determines at either step 144 or 162 that port PT0 is the output seed, it reverts to step 147 where it checks whether it has the output token (step 147). If the output seed has received the token, the output token passing cycle has ended, all output arbiters having received and passed the output token. Thus state machine 127 sets its END_CYCLE output signal (FIG. 10) to turn on tri-state buffer 130 to put the EOC code on the OUTPUT_PORT lines (step 166) to signal the end of the output token passing cycle. State machine 127 then waits (step 168) until the central arbiter 22 (FIG. 2) responds to the EOC code by pulsing the GRANTED signal. State machine 22 then returns to initialize step 140, re-initializes the output arbiter and thereafter awaits the start of another output token passing cycle (step 142).

Input Arbiter—Output Polling

Figure 12:
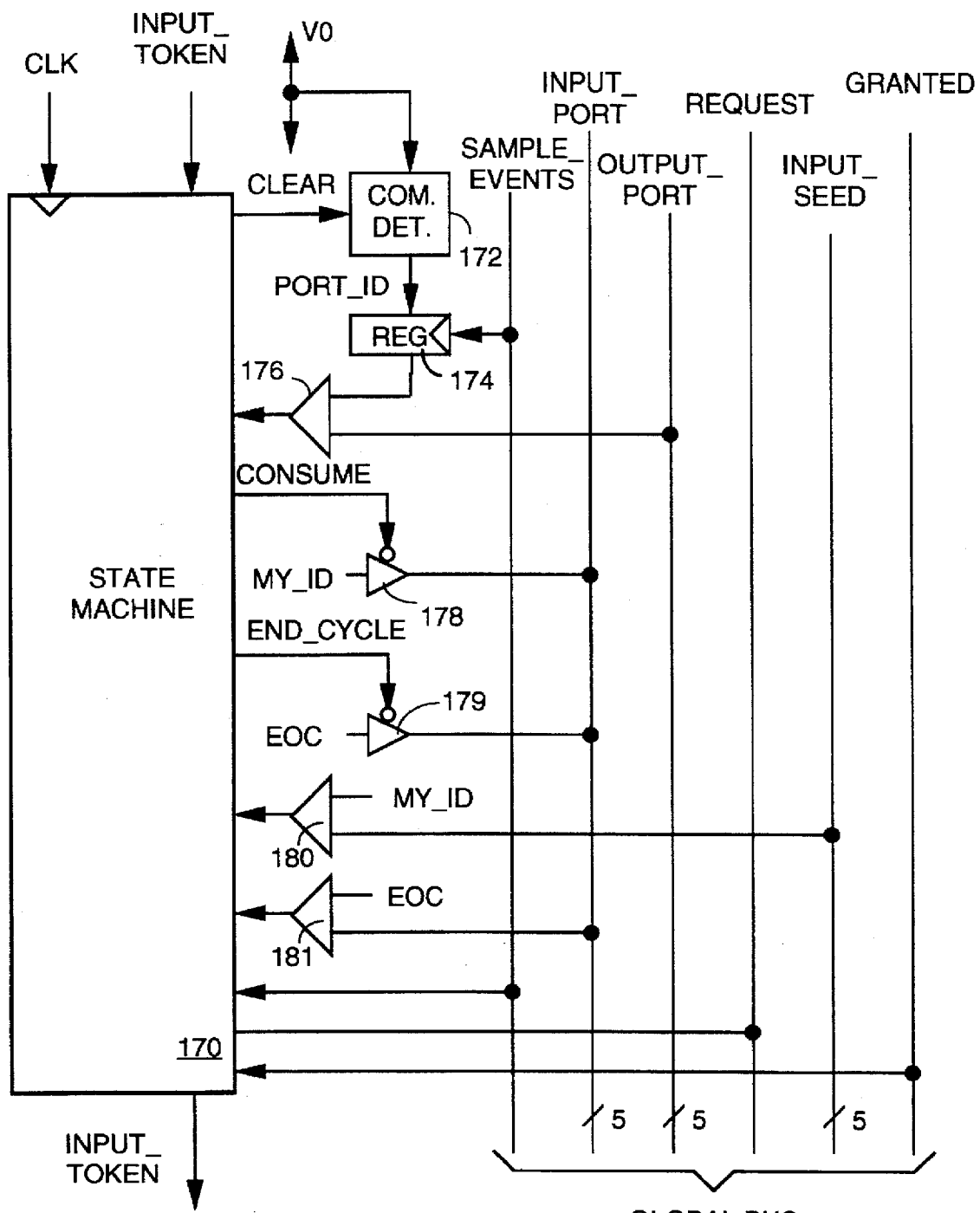
FIG. 12 illustrates an output polling version of input arbiter RA0 of FIG. 2 in more detailed block diagram form.

FIG. 12 illustrates an input arbiter RA0 of FIG. 2 for use in the output polling arbitration system. Arbiters RA1–RA23 are similar. Arbiter RA0 includes a state machine 170 for sequencing arbiter operations. An interface circuit 172 monitors a connection requests arriving from input buffer RB0 via vertical line V0 of switch 12 (FIG. 2) and stores the ID (PORT_ID) of the destination port conveyed in an incoming request. If the V0 line is not conveying a packet, or when interface circuit 172 detects the end of a packet transmission on the VO line, interface circuit 172 supplies its stored PORT_ID data to the input of a register 174, input enabled by the SAMPLE_EVENTS signal. When the connection request is granted, state machine 170 pulses a CLEAR signal to clear the PORT_ID data stored in interface 172. A comparator 176 signals state machine 170 when the destination port ID (PORT_ID) stored in register 174 matches the ID conveyed on the OUTPUT_PORT line. A tri-state buffer 178 when enabled by a CONSUME output of state machine 170, places the ID (MY_ID) of input buffer RB0 on the INPUT_PORT lines. A tri-state buffer 179 when enabled by a END_CYCLE output of state machine 170, places the EOC code on the INPUT_PORT lines. A comparator 180 signals state machine 170 when MY_ID, the ID of input buffer RB0, matches the input port ID conveyed on the INPUT_SEED lines. A comparator 181 signals state machine 170 when the INPUT_PORT lines convey the EOC code.

Figure 13:
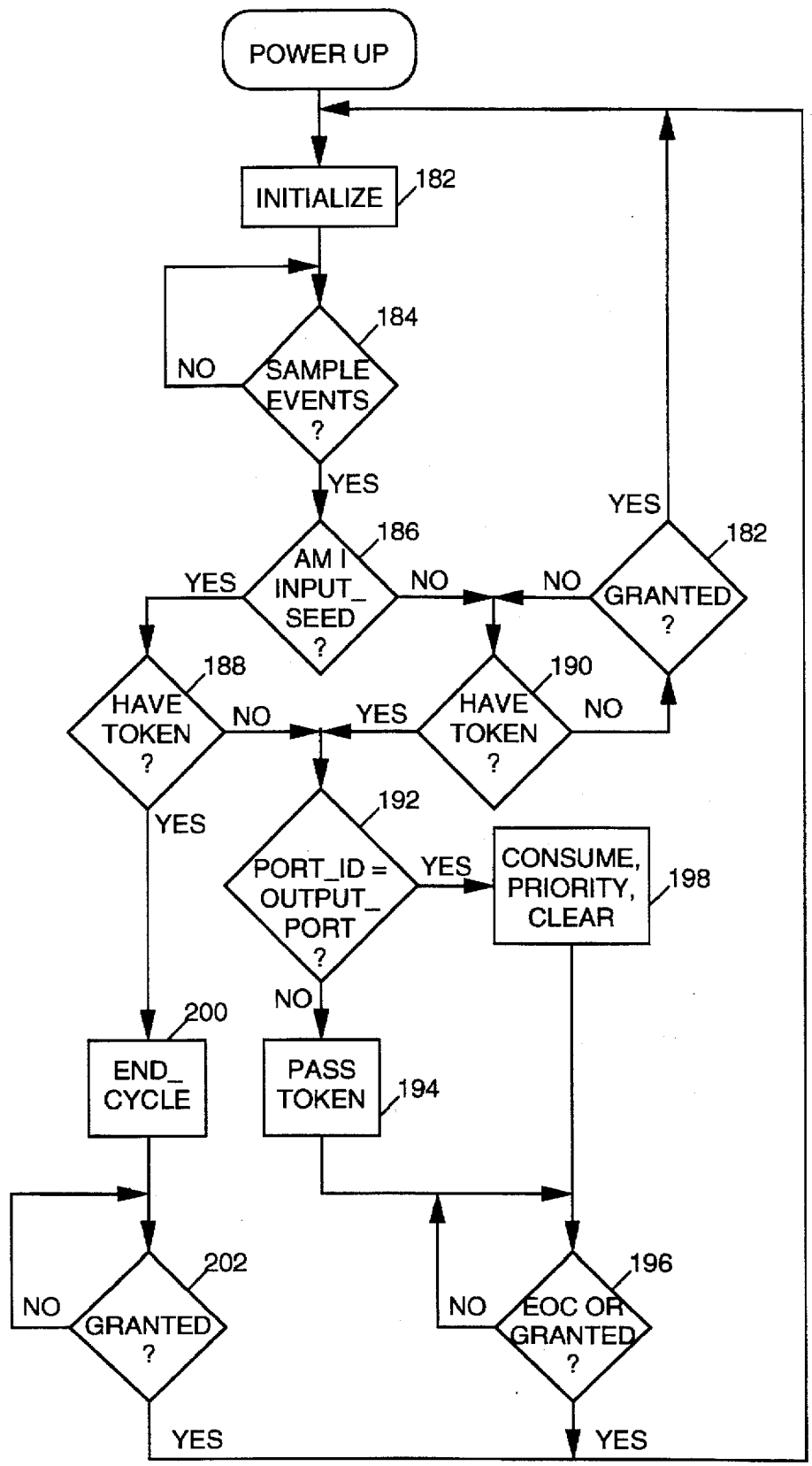
FIG. 13 is a flow chart illustrating operation of state machine 170.

FIG. 13 is a flow chart illustrating operation of state machine 170. Referring to FIGS. 12 and 13, following system power up, state machine 170 initializes by setting its CONSUME output signal to turn off buffer 178 and by pulsing the CLEAR signal to initialize the PORT_ID data in interface circuit 172 (step 182). Thereafter state machine waits (step 184) until it detects a pulse on the SAMPLE_EVENTS line, indicating the start of a token passing cycle. State machine 170 then checks the output of comparator 180 to determine if its input port (RP0) is the input seed (step 186). If port RP0 is the input seed and does not have the token (step 188) or if input port RP0 is not the input seed but does have the token (step 190), state machine 170 checks the output of comparator 176 to determine if there is a pending request for the output buffer whose ID appears on the OUTPUT_PORT lines (step 192). If input port RP0 does not have a pending request for the output buffer, state machine 170 passes the input token (step 194) by asserting its output INPUT_TOKEN signal. It then waits for a pulse of the GRANTED signal or appearance of an EOC code on the INPUT_PORT lines (step 196) indicating the end of either an output or input token passing cycle. Thereafter, state machine 170 reinitializes (step 182) and waits for the start of another input token passing cycle (step 184).

If at step 190 state machine 170 has not received the input token, it cycles through steps 190 and 191 until it receives the input token (step 190) or until it detects from the outputs of comparator 180 that a request has been granted (step 191). If a request is granted to another input before state machine 170 receives the input token, state machine 170 re-initializes (step 182) and waits for the start of another input token passing cycle (step 184).

If at step 192 state machine 170 determines from the output of buffer 176 that it has a pending request for the output buffer whose ID appears on the OUTPUT_PORT lines, then at step 198 state machine 170 sets its CONSUME signal output to turn on buffer 178 thereby placing the ID of input port RP0 on the INPUT_PORT lines. At step 198 state machine 170 also asserts the REQUEST signal to signal that it is requesting a connection and pulses its CLEAR output to clear the connection request in interface circuit 172. The state machine 170 then waits for a pulse of the GRANTED signal or appearance of an EOC code on the INPUT_PORT lines (step 196) indicating the end of either an output or input token passing cycle. Thereafter, state machine 170 re-initializes (step 182) and waits for the start of another input token passing cycle (step 184).

If state machine 170 determines at step 186 that its input port is the input seed and at step 188 that it has the input token, then state machine 170 sets its END_CYCLE output signal so that buffer 179 places the EOC code on the INPUT_PORT line (step 200) to signal the end of the input token passing cycle. It then waits (step 202) for sequencer 22 of FIG. 2 to acknowledge the end of the input token passing cycle by pulsing the GRANTED signal. Thereafter state machine 170 re-initializes (step 182) and waits for the start of another input token passing cycle (step 184).

Arbitration Sequencer—Output Polling

Figure 14:
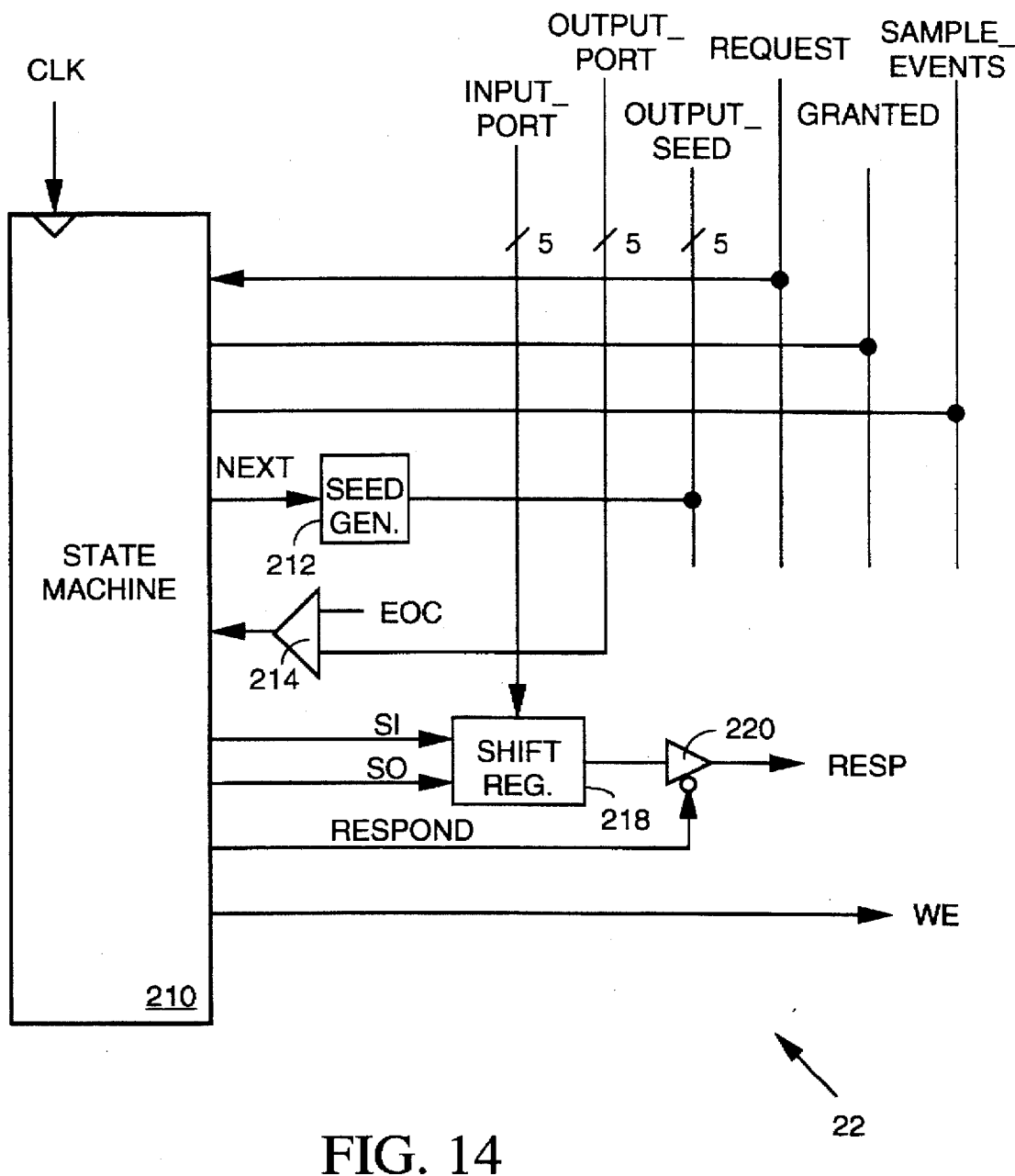
FIG. 14 illustrates an output polling version of arbitration sequencer 22 of FIG. 2 in more detailed block diagram form.

FIG. 14 illustrates arbitration sequencer 22 of FIG. 2 in more detailed block diagram form. Sequencer 22 includes a state machine 210 for sequencing device operations. An output seed generator 212 contains a rotating table of output port IDs and places one of the output port IDs on the OUTPUT_SEED lines of the global bus. A pulse of a NEXT signal produced by state machine 210 tells seed generator 212 to select a next one of the output port IDs from its rotating table for placement on the OUTPUT_SEED lines. A comparator 214 signals state machine 210 when the OUTPUT_PORT lines convey the EOC (end-of-cycle) code. State machine 210 also supplies the write enable signal WE for the memory controller. When state machine pulses a shift in (SI) signal, a parallel-in/serial out shift register 218 stores the input port ID appearing on the INPUT_PORT lines. When state machine 210 asserts a RESPOND signal, a tri-state buffer 220 connects the output of shift register 218 to a response line RESP of the Global bus. State machine pulses a shift out signal (SO) to serially shift the input port ID out of shift register 218, thereby sending a response to input buffers RB0-RB23 of FIG. 2 via the RESP lines. This tells the indicated input buffer that its last connection request has been granted.

Figure 15:
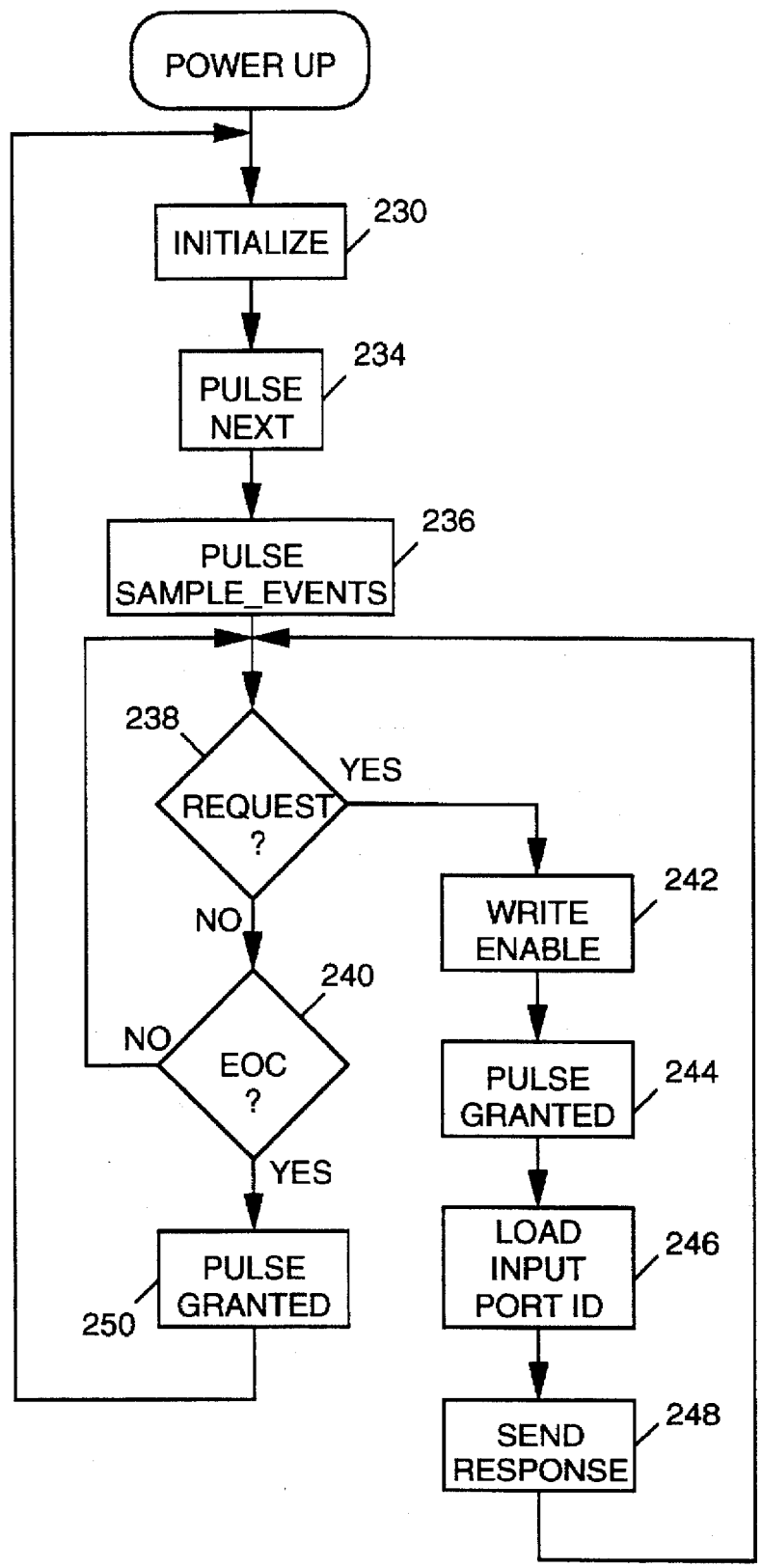
FIG. 15 is a flow chart illustration operation of state machine 210 of FIG. 14.

FIG. 15 is a flow chart illustration operation of state machine 210 of FIG. 14. Referring to FIGS. 14 and 15, state machine 210 initializes following power up by setting the RESPOND signal to turn off buffer 220, and driving its GRANTED and SAMPLE_EVENTS signals low. (step 230). State machine 210 then pulses the NEXT signal causing seed generator 212 to place an output port ID on the OUTPUT_SEED lines (step 234). State machine 210 next pulses the SAMPLE_EVENTS line to signal the start of an output token passing cycle (step 236). It then continues to repeat steps 238 and 240 until at step 238 it detects a pulse on the REQUEST signal or at step 240 comparator 214 signals detection of the EOC code on the OUTPUT_PORT line.

An input arbiter pulses the REQUEST signal to request a connection between input and output ports identified by the codes on the INPUT_PORT and OUTPUT_PORT lines. On detection of the REQUEST signal pulse at step 238, state machine 210 transmits a write enable signal WE to memory controller 24 of FIG. 2 (step 242). The memory controller responds by storing data in RAM 14 of FIG. 2 establishing the connection between the winning input and output ports. State machine 210 then pulses the GRANTED line (step 244) to tell the input and output buffers that the request is granted and pulses the SI signal to load the input port ID into shift register 218 (step 246). State machine 210 then sends a response to the input buffers (step 248) by asserting the RESPOND signal to turn on buffer 220 and pulsing the SO signal to shift the input port ID onto the RESP line via buffer 220. Thereafter state machine 210 returns to steps 238/240. If, at step 240, comparator 214 signals state machine 210 that it has detected the end of an output token passing cycle, state machine 210 re-initializes (step 230) and begins a next output token passing cycle.

EVENT DRIVEN ARBITRATION

In an alternative embodiment of the invention, s illustrated in FIGS. 16–22, LAN switch 10 of FIG. 2 employs event driven arbitration. In this system, an output arbitration cycle begins either when an output buffer becomes newly idle or when an input buffer issues a new connection request. In the event driven version of switch 10, the global bus interconnecting the input and output arbiters and the arbitration sequencer 22 includes 26 lines conveying 10 data values or control signals as illustrated in Table V.

TABLE V

| VALUE/SIGNAL | LINES | PURPOSE |
| --- | --- | --- |
| CLK | 1 | Global clock |
| INPUT_SEED | 5 | Input seed ID |
| OUTPUT_SEED | 5 | Output seed ID |
| INPUT_PORT | 5 | Input token holder ID |
| OUTPUT_PORT | 5 | Output token holder ID |
| OUTPUT_ARB_CYCLE | 1 | Starts output token passing |
| INPUT_ARB_CYCLE | 1 | Starts input token passing |
| SAMPLE_EVENTS | 1 | Samples new request for new idle |
| NEW_REQ | 1 | New request signal |
| NEW_IDLE | 1 | New idle signal |

Arbitration Sequencer—Event Driven

Figure 16:
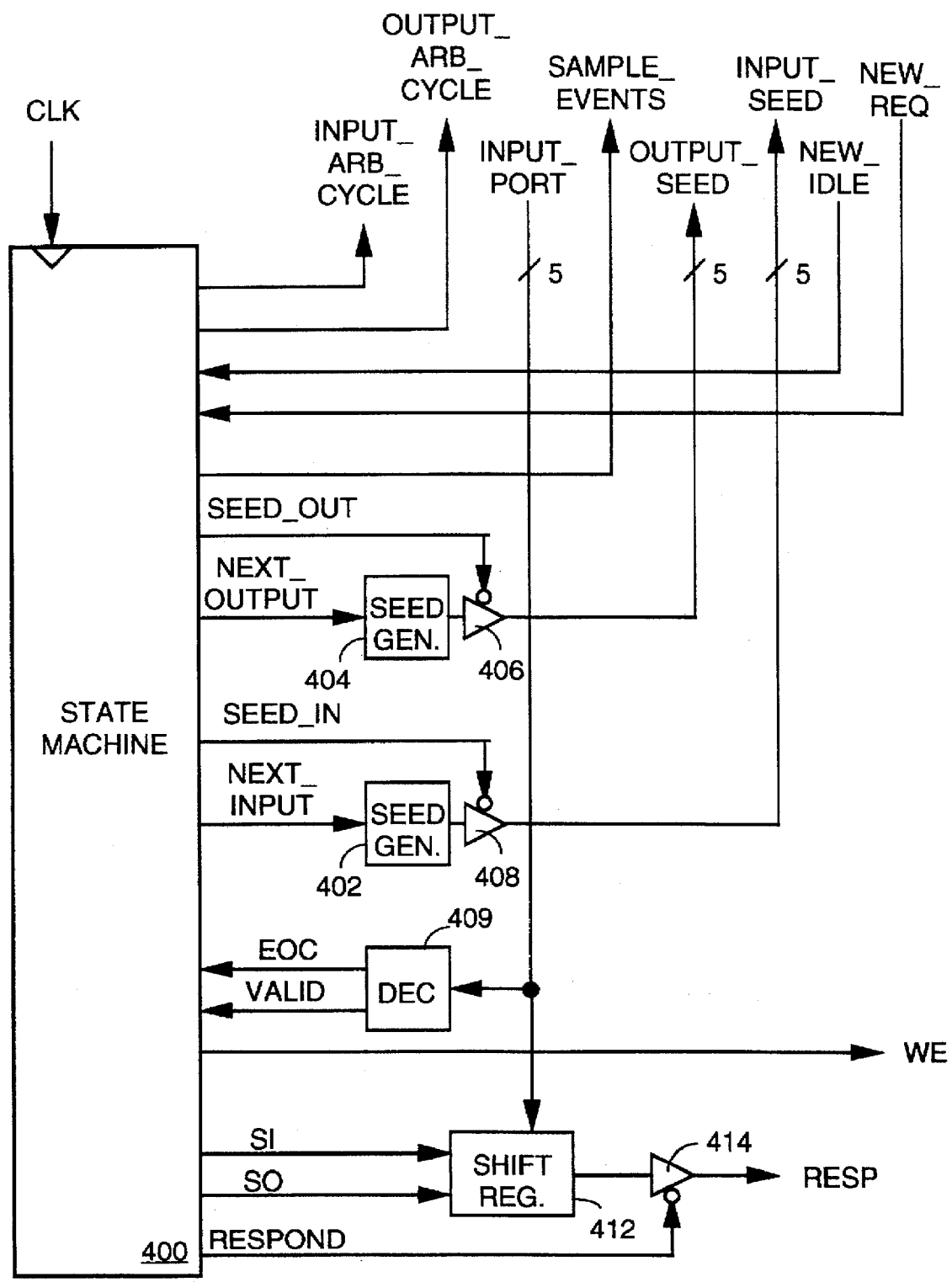
FIG. 16 illustrates an event driven version of arbitration sequencer 22 of FIG. 2 in more detailed block diagram form.

FIG. 16 illustrates the event driven version of arbitration sequencer 22 of FIG. 2 in more detailed block diagram form. Sequencer 22 includes a state machine 400 for controlling sequencer operation, and seed generator circuits 402 and 404 for generating an output and input seeds. Tri-state buffers 406 and 408 respectively connect outputs of seed generator circuits 402 and 404 to the OUTPUT_SEED and INPUT_SEED lines of the GLOBAL bus. A decoder 408 signals state machine 400 when detects EOC (end of cycle) or valid input port ID codes on the INPUT_PORT lines of the GLOBAL bus. A shift register 412, connected to the RESP bus via a tri-state buffer 414 serially transmits the ID of a winning input buffer appearing on the INPUT_PORT lines as a connection response to the input buffers.

Figure 17:
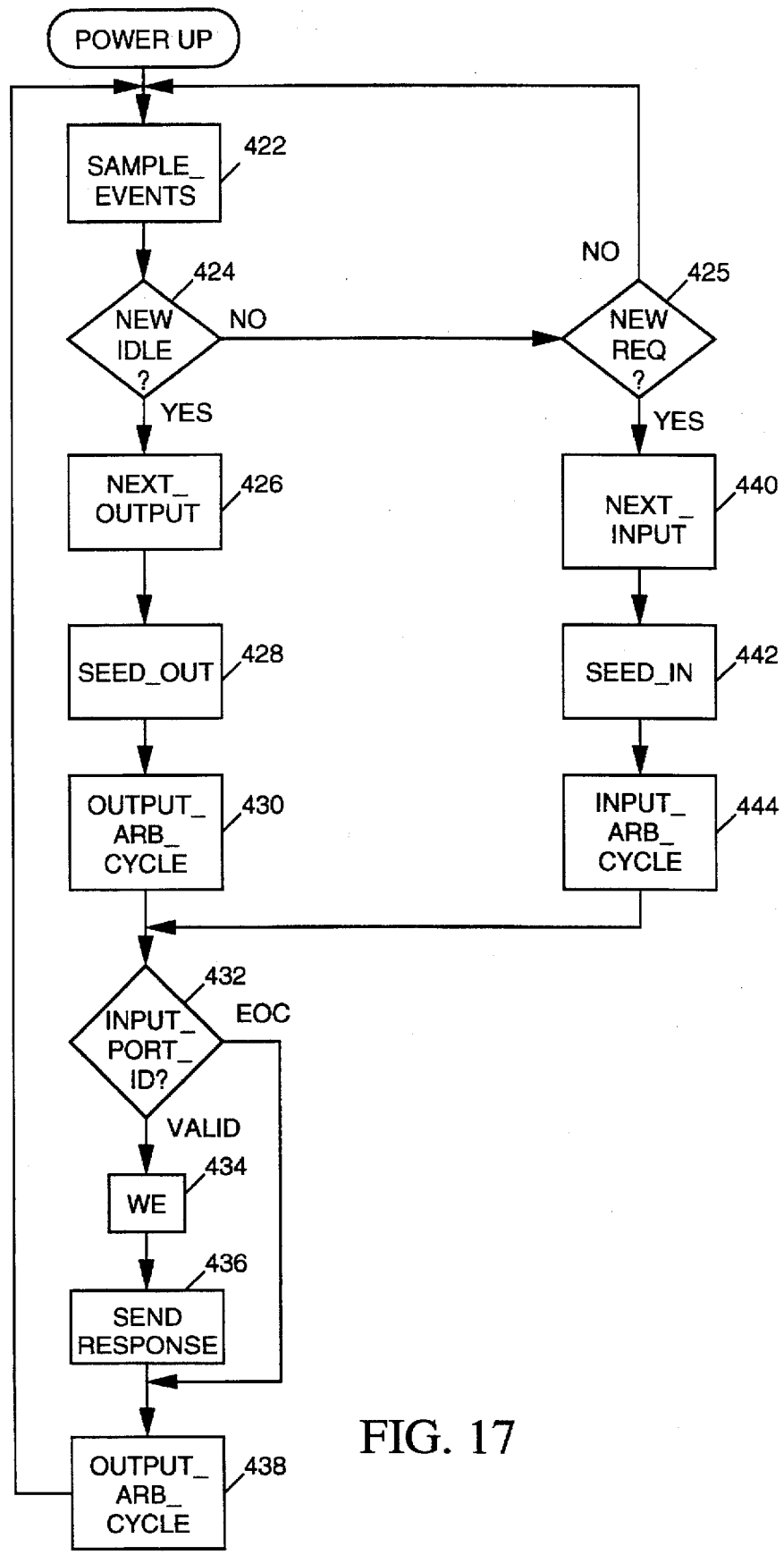
FIG. 17 is a flow chart detailing the logic of state machine 400 of FIG. 16.

FIG. 17 is a flow chart detailing the logic of state machine 400 of FIG. 16. Referring to FIGS. 16 and 17, after system power up, state machine 400 transmits a pulse on a SAMPLE_EVENTS line of the GLOBAL bus to all input and output arbiters (step 422). On receipt of the SAMPLE_EVENTS pulse, each output arbiter for an output buffer having become idle since a last received SAMPLE_EVENTS pulse asserts a NEW_IDLE signal on a line of the GLOBAL bus. Similarly on receipt of a SAMPLE_EVENTS pulse, each input arbiter having stored a new connection request since the last SAMPLE_EVENTS pulse asserts a NEW_REQ line of the GLOBAL bus. State machine 400 checks the NEW_IDLE and NEW_REQ lines (steps 424 and 425), and if neither line is asserted, returns to step 422 where it again pulses the SAMPLE_EVENTS line. State machine 400 continues to cycle through steps 422, 424 and 425 until it detects assertion of either the NEW_IDLE or the NEW_REQ line.

On detecting assertion of the NEW_IDLE line, state machine 400 pulses a NEXT_OUTPUT signal telling seed generator 402 to output a new output seed (step 426) and then asserts a SEED_OUT signal (step 428) to turn on tri-state buffer 406 to place the output seed on the OUTPUT_SEED lines of the GLOBAL bus. State machine 400 then pulses an OUTPUT_ARB_CYCLE line of the GLOBAL bus (step 430).

The OUTPUT_ARB_CYCLE pulse tells the input and output arbiters to arbitrate for a connection. The state machine 400 then waits at step 432 until decoder 408 detects on the INPUT_PORT lines either a valid input port ID, indicating that a connection request is ready to be granted, or an end-of-cycle code (EOC) indicating that no connection request is ready to be granted. If the arbiters determine that a connection request can be granted, the IDs of the winning input and output buffers appear on the INPUT_PORT and OUTPUT_PORT lines. When decoder 408 indicates a valid input port ID appears on the INPUT_PORT lines, state machine 400 sends the write enable signal WE to memory controller telling it to grant the request by making the connection (step 434). State machine 400 then sends a response to the input buffers (step 436) by pulsing an SI signal causing shift register 412 to load the input port ID on the INPUT_PORT lines, asserting a RESPOND signal to turn on tri-state buffer 414, and then successively pulsing an SO signal causing shift register 412 to shift out the input port ID onto the RESP line to the input buffers. Thereafter state machine 400 pulses the OUTPUT_ARB_CYCLE line to tell all arbiters that the request has been granted (step 438). State machine 400 then returns to step 422. If at step 432 decoder 408 detects the EOC code on the INPUT_PORT lines, state machine 400 skips steps 434 and 436 and no connection is granted.

On detecting assertion of the NEW_REQ line at step 425, state machine 400 pulses a NEXT_INPUT signal telling seed generator 404 to output a new input seed (step 440) and then asserts a SEED_IN signal (step 442) to turn on tri-state buffer 408 to place the input seed on the INPUT_SEED lines of the GLOBAL bus. State machine 400 then pulses an INPUT_ARB_CYCLE line of the GLOBAL bus (step 444). The INPUT_ARB_CYCLE pulse tells the input and output arbiters to arbitrate for a connection. The state machine 400 then performs steps 432, 434, 436 438 in the manner described above to grant any connection requested by the input and output arbiters and to send a response to the input buffers if a connection is granted.

Output Arbiter—Event Driven.

Figure 18:
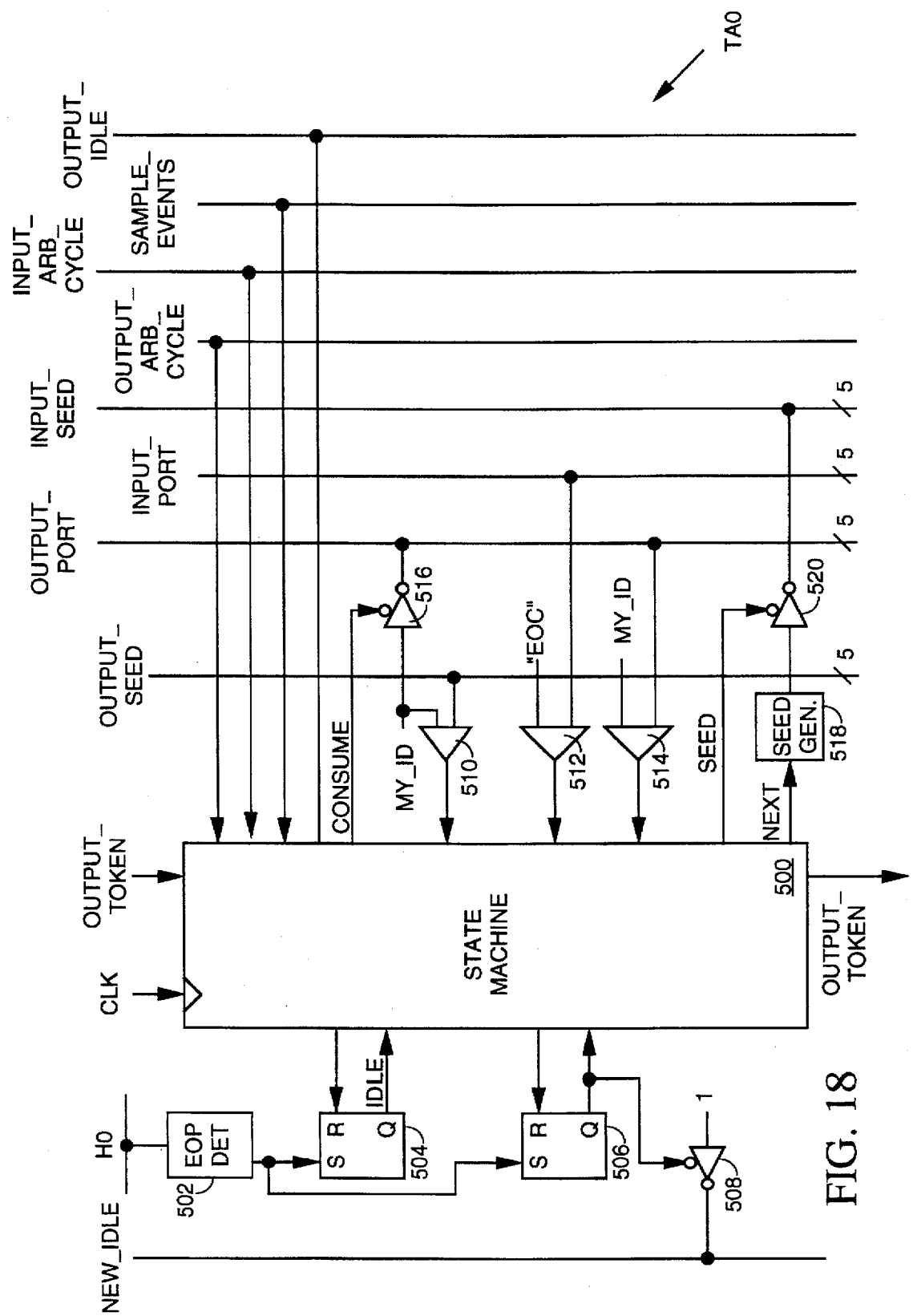
FIG. 18 illustrates an event driven version of output arbiter TD0 of FIG. 2 in more detailed block diagram form.

FIG. 18 illustrates the event driven version of output arbiter TA0 of FIG. 2 in more detailed block diagram form. Output arbiters TA1-TA23 of FIG. 2 are similar. Arbiter TA0 includes a state machine 500 for controlling arbiter operations. An end-of-packet (EOP) detector 502 detects the end of a packet passing along horizontal line H0 of crosspoint switch 12 of FIG. 2 to output buffer TB0. On detecting a packet end, detector 502 sets a pair of flip-flops 504 and 506 which may be separately reset by state machine 500. The Q output of flip-flop 504 supplies an IDLE input to state machine 500. The Q output of flip-flop 506 provides another input to state machine 500 and turns on a tri-state buffer 508 which pulls down (asserts) the NEW_IDLE line of the GLOBAL bus. A comparator 510 signals state machine 500 when the ID (MY_ID) of output port TP0 appears on the OUTPUT_SEED lines. A comparator 512 signals state machine 500 when the end of cycle (EOC) code appears on the INPUT_PORT lines. A comparator 514 signals state machine 500 when MY_ID appears on the OUTPUT_PORT lines. A tri-state buffer 516 responds to a CONSUME signal from state machine 500 by placing MY_ID on the OUTPUT_PORT lines. A seed generator 518 linked to the INPUT_SEED lines via a tri-state buffer 520 places an input port ID on the INPUT_SEED lines when state machine 500 asserts a SEED signal. When state machine 520 supplies a NEXT signal pulse to seed generator 518, the seed generator selects a next input port ID as the input seed.

Figure 19:
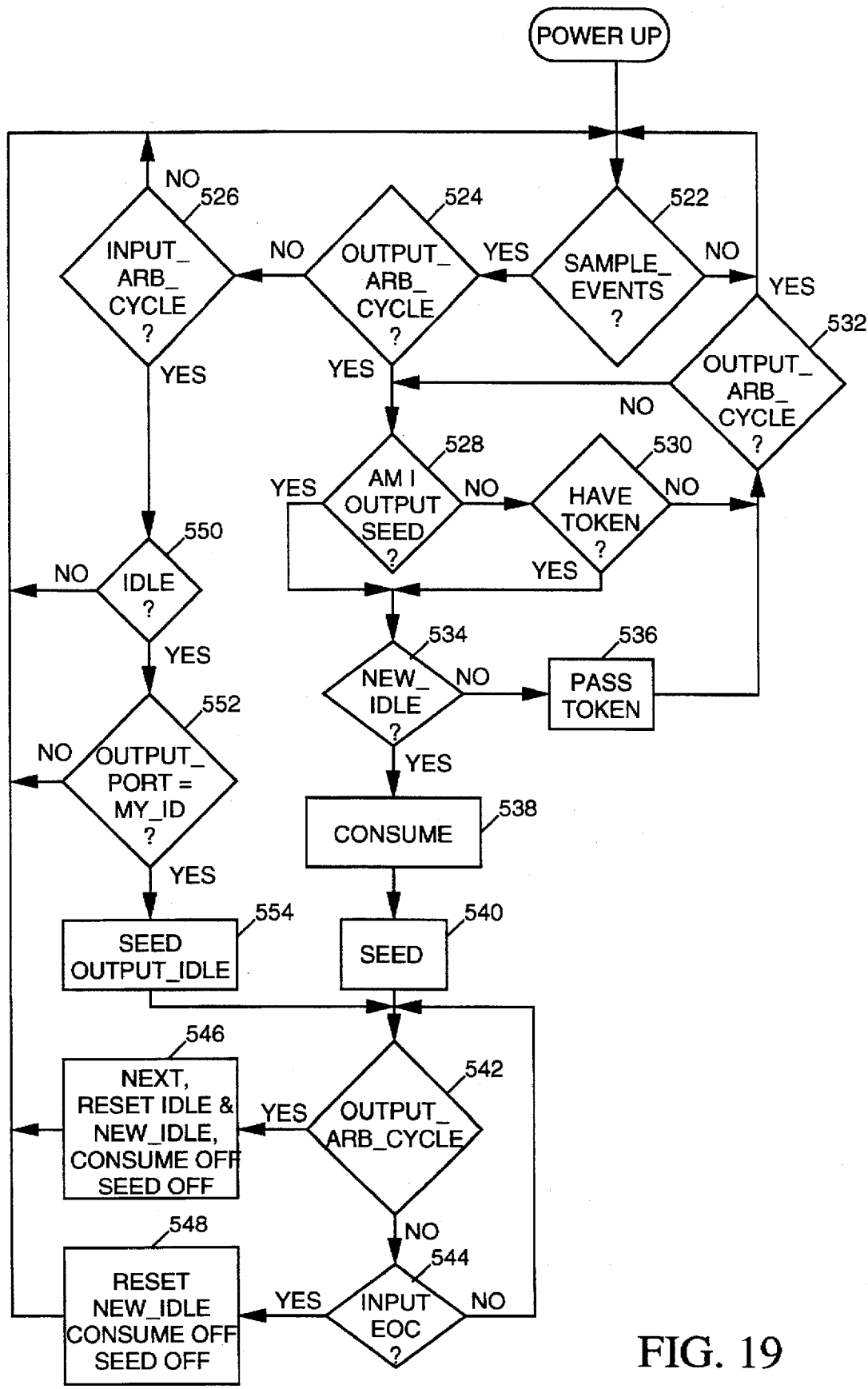
FIG. 19 is a flow chart illustrating operation of state machine 500 of FIG. 18.

FIG. 19 is a flow chart illustrating operation of state machine 500 of FIG. 18. Following system start up, state machine 500 waits for a pulse on the SAMPLE_EVENTS line (step 522). On receipt of the SAMPLE_EVENTS pulse, it checks whether the central arbitration sequencer is asserting the OUTPUT_ARB_CYCLE or INPUT_ARB_CYCLE lines (steps 524 and 526). As discussed above, sequencer 22 of FIG. 2 places a port ID on the OUTPUT_SEED lines and pulses the OUTPUT_ARB_CYCLE line if one or more of the output arbiters are asserting the NEW_IDLE line. Output arbiter TA0 responds to the OUTPUT_ARB_CYCLE pulse by checking the output of comparator 510 to determine if its port (TP0) is the output seed (step 528). If not, arbiter TA0 determines whether it has received the output token (step 530). If it has not received the output token, it checks whether the central arbitration sequencer is again asserting the OUTPUT_ARB_CYCLE signal (step 532). If, so the output token passing cycle is over, another output arbiter having won the arbitration. State machine 500 then returns to step 522 to await another token passing cycle. Otherwise, if the OUTPUT_ARB_CYCLE signal has not been asserted, state machine 500 returns to step 528.

If at step 528 state machine 500 learns that it is the output seed, or learns that port TP0 is not the output seed (step 528) and state machine 500 of arbiter TA0 has received the output token, state machine 500 checks the IDLE signal from flip-flop 506 to determine if its output port TP0 is newly idle (step 534). If not, state machine 500 passes the output token (step 536) and returns to step 528 via step 532. Otherwise, if output port TP0 is idle (step 534), state machine 500 asserts a CONSUME signal to turn on tri-state buffer 516 (step 538), thereby placing the ID (MY_ID) of output port TP0 on the OUTPUT_PORT lines. State machine 500 also asserts the SEED signal to turn on tri-state buffer 520, thereby placing an input port ID produced by seed generator 518 on the INPUT_SEED lines (step 540). This tells the input arbiters to arbitrate for the right to connect to port TP0.

While the input arbiters are arbitrating, output arbiter TA0 monitors the OUTPUT_ARB_CYCLES line (step 542) and the output of comparator 512 (step 544) to determine whether the arbitration was successful or unsuccessful. If the arbitration was successful, the central arbitration sequencer will pulse the OUTPUT_ARB_CYCLE line 542 and state machine 500 will (at step 546) pulse its NEXT signal to increment the output of seed generator 134, reset flip-flops 504 and 506 to indicate the output buffer is no longer idle, and de-assert the CONSUME and SEED signals to turn off buffers 516 and 520. State machine 500 then reverts to step 522 to await the start of another token passing cycle.

If the arbitration was unsuccessful (no input port had a pending request for the newly idle output port TP0), then the seed input arbiter will place the EOC code on the INPUT_PORT lines and comparator 512 will notify state machine 500 of this event. At that point state machine 500 will (step 548) reset flip-flop 506 and de-assert the CONSUME and SEED signals to turn off buffers 516 and 520. Note that since port TP0 is still idle the state machine 500 does not reset flip-flop 504. But it does reset state machine 506 because port TP0 is no longer "newly" idle.

When one or more of the input arbiters asserts the NEW_REQ line, the central arbitration sequencer will start an input token passing cycle by pulsing the SAMPLE_EVENTS line and INPUT_ARB_CYCLE lines. At step 526 state machine 500 responds to the INPUT_ARB_CYCLE pulse by checking the IDLE output of FLIP-FLOP 504 to determine if output port TP0 is idle (step 550). If the output buffer is not idle, state machine 500 returns to step 522 to await the start of a new token passing cycle. If output port TP0 is idle, state machine 500 checks the output of comparator 514 to determine if the ID of output port TP0

(MY_ID) is on the OUTPUT_PORT lines (step 552). If not, state machine 500 returns to step 522 to await a new token passing cycle. If MY_ID appears on the OUTPUT_PORT lines, then an input buffer with a pending request for port TP0 has won the right to have the request granted. Thereafter (step 554) state machine 500 asserts the SEED signal to turn on buffer 520 which places an input port ID on the INPUT_SEED lines. State machine 500 also asserts and OUTPUT_IDLE line (step 554). Thereafter state machine 500 where it waits for assertion of the OUTPUT_ARB_CYCLE signal indicating the connection request has been granted (step 542). When the connection request is granted, state machine 500 pulses its NEXT signal to increment the output of seed generator 518 and resets flip-flops 504 and 506 to indicate the output buffer is no longer idle (step 546) and then reverts to step 522 to await the start of another token passing cycle.

Input Arbiter—Event Driven

Figure 20:
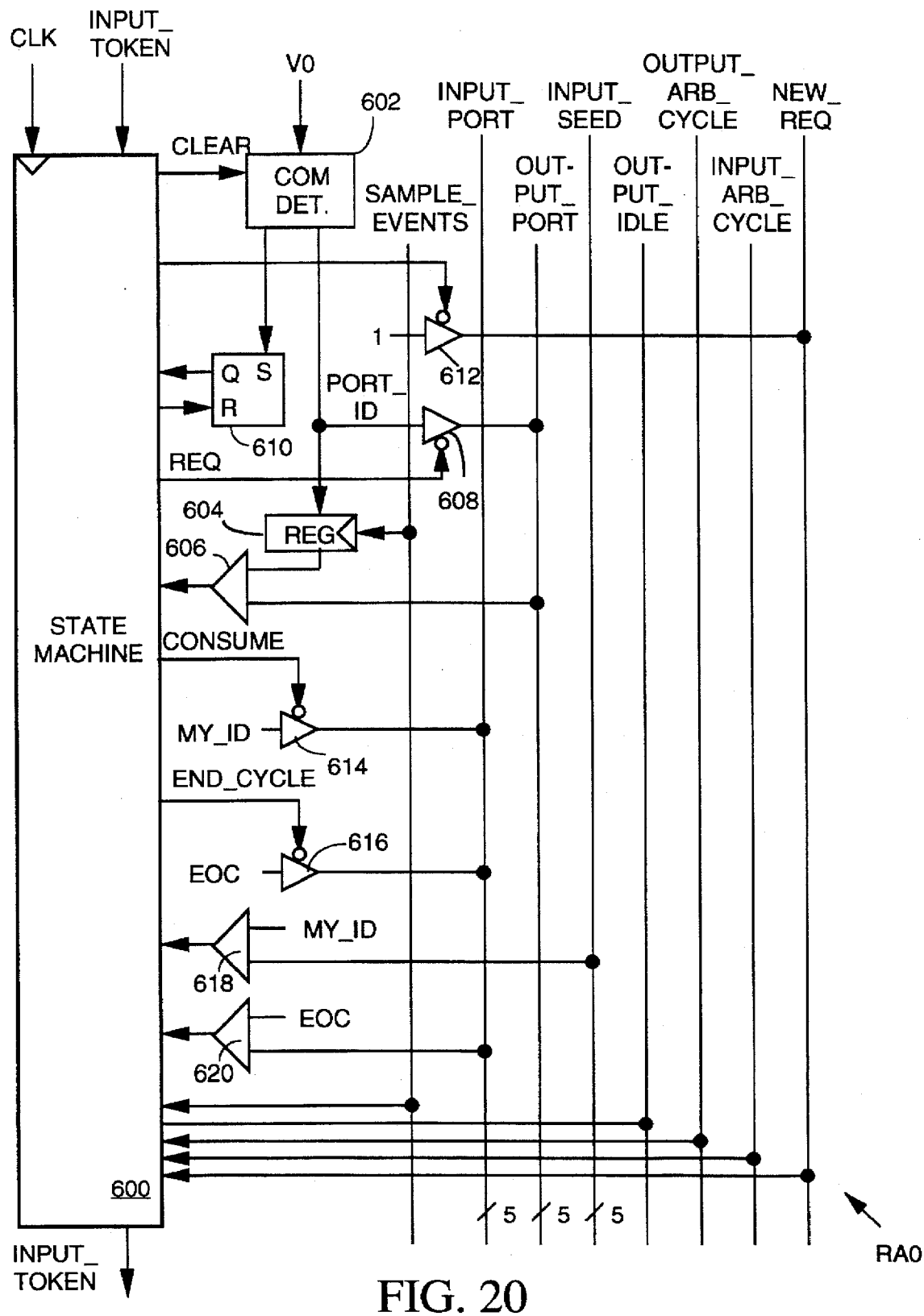
FIG. 20 illustrates an event driven version of output arbiter RA0 of FIG. 2 in more detailed block diagram form.

FIG. 20 illustrates the event driven version of output arbiter RA0 of FIG. 2 in more detailed block diagram form. Output arbiters RA1–RA23 of FIG. 2 are similar. Arbiter RA0 includes a state machine 600 for controlling arbiter operations. An interface circuit 602 watches for commands appearing on vertical line V0 of switch 12 (FIG. 2) from input buffer RB0, stores the destination port ID (PORT_ID) conveyed in the command. Interface circuit 602 determines when line V0 is conveying a data packet by noting the beginning and ending of data packets. When line V0 is no longer busy, circuit 602 sets a flip-flop 610. The Q output of flip-flop 610 provides an input to state machine 600 and also turns on a tri-state buffer 612. The output of buffer 612 pulls down (asserts) the NEW_REQ line of the GLOBAL bus when buffer 612 is turned on. Interface circuit 602 produces output data indicating the requested destination output port ID (PORT_ID). A register 604 stores the PORT_ID data in response to a SAMPLE_EVENTS signal pulse and a comparator 606 signals state machine 600 when the PORT_ID data stored in register 604 matches the port ID appearing on the OUTPUT_PORT lines of the GLOBAL bus. A tristate buffer 608 places the PORT_ID data stored in register 604 on the OUTPUT_PORT lines when state machine 600 asserts output signal REQ.

When circuit 602 receives a connection request it sets flip flop 610 When the request has been granted, state machine 600 resets flip-flop 610. It also pulses a CLEAR output signal to tell circuit 602. The CLEAR signal pulse tells circuit 602 to clear the PORT_ID data from its memory and begin watching for another connection request. A tri-state buffer 614 places MY_ID (the ID of input port RP0) on the INPUT_PORT line when turned on by a CONSUME signal output of state machine 600. A tri-state buffer 616 places the EOC code on the INPUT_PORT line when turned on by an END_CYCLE signal output of state machine 600. A comparator 618 signals state machine 600 when MY_ID appears on the INPUT_SEED lines and a comparator 620 signals state machine 600 when the EOC code appears on the INPUT_PORT lines.

Figure 21:
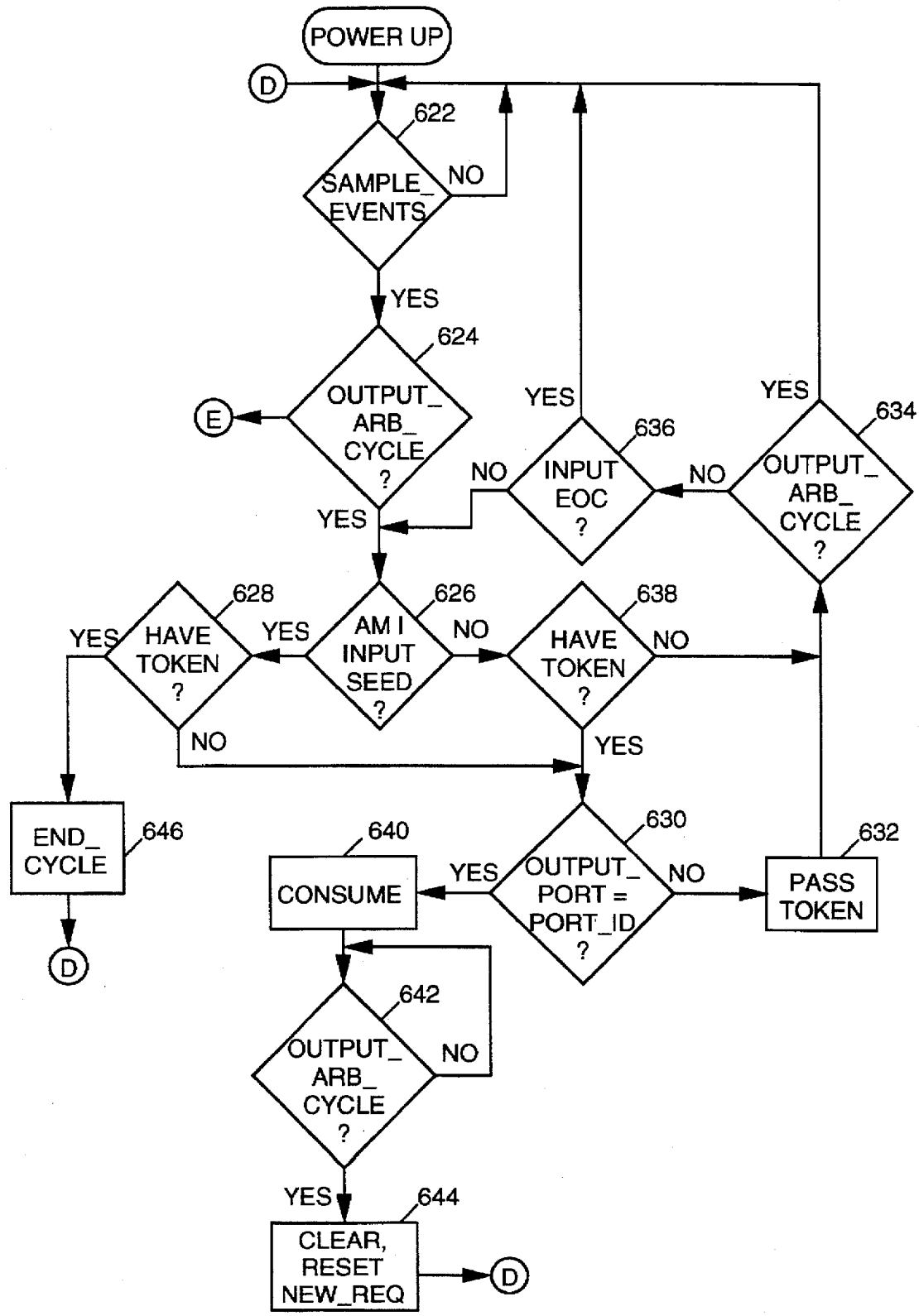
FIGS. 21 and 22 are flow charts depicting operations of state machine 600 of FIG. 20.
Figure 22:
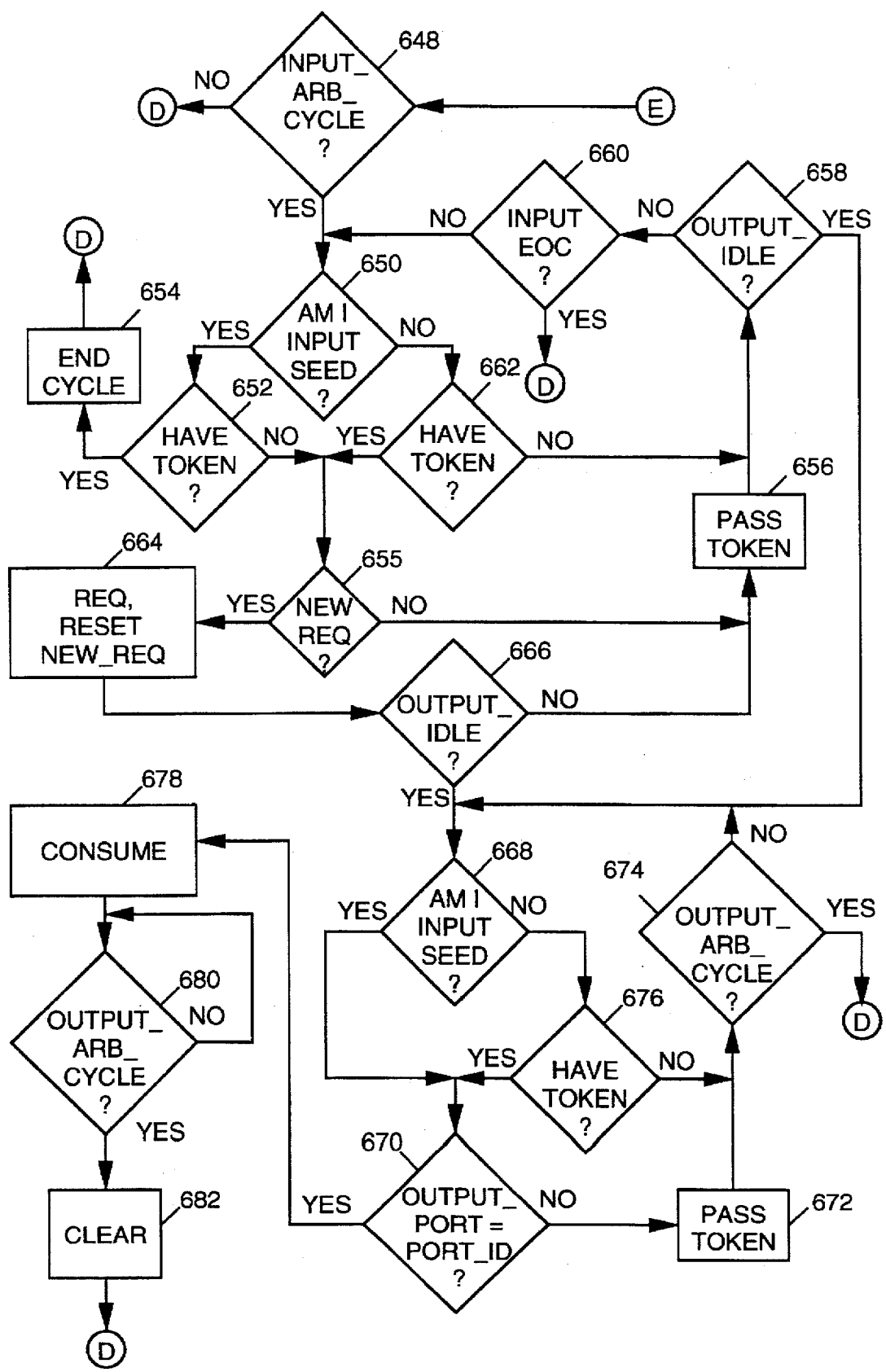

FIGS. 21 and 22 are flow charts depicting operations of state machine 600 of FIG. 20. Referring to FIGS. 21 and 22, after system power up, state machine 600 waits for a pulse of the SAMPLE_EVENTS signal (step 622) and then looks for a pulse of the OUTPUT_ARB_CYCLE signal (step 624) indicating that an output port is newly idle and that an output token passing cycle has begun. If so, state machine 600 checks the output of comparator 618 to determine if its input port RP0 is the input seed (step 626). If input port RP0 is the input seed, state machine 600 checks whether it has received the input token (step 628). If not, state machine 600 checks the output of comparator 606 to determine if the output port ID appearing on the OUTPUT_PORT lines matches the PORT_ID value stored in register 604. If not, state machine 600 pass the input token (step 632) and then looks for a pulse on the OUTPUT_ARB_CYCLE line indicating the output arbitration has been won by another input port (step 634). If another input port has not won, state machine 600 checks the output of comparator 620 to determine if the EOC code appears on the INPUT_PORT lines. If not, state machine returns to step 626.

IF input port RP0 is not the input seed (step 626), then state machine 600 determines whether it has received the input token (step 638) and if not, returns to step 626 via steps 634 and 638. When state machine 600 determines at step 638 it has received the input token, it moves to step 630. If at step 630 the output of comparator 606 indicates the port ID on OUTPUT_PORT matches PORT_ID in register 604, then port RP0 has a pending request for the indicated output port. In that event, state machine 600 asserts the CONSUME signal to place MY_ID (the ID of input buffer RB0) on the INPUT_PORT lines (640) and then waits (step 642) for the central arbitration sequencer to pulse the OUTPUT_ARB_CYCLE to indicate the connection between input and output buffers has be made. At that point (step 644) state machine 600 pulses the CLEAR signal to clear the request from circuit 602 and resets flip-flop 610 to turn off the NEW_REQ signal. It then returns to step 622 to await the start of a new input token passing cycle. If at step 628 input port TP0 is the input seed and state machine 600 has determined that it has received the input token, state machine asserts the END_CYCLE signal (step 646) causing buffer 616 to place the EOC code on the INPUT_PORT lines. The EOC code tells all arbiters that no input buffer has a pending request for the newly idle output buffer. State machine 600 then reverts to step 622 to await another token passing cycle.

If at step 624 state machine 600 does not detect an OUTPUT_ARB_CYCLE pulse, it looks for an INPUT_ARB_CYCLE pulse from the central arbitration sequencer (step 648, FIG. 22) indicating that an input buffer has a new connection request. On detecting the INPUT_ARB_CYCLE pulse, state machine 600 checks the output of comparator 618 to determine if input port RP0 is the input seed (step 650). If so state machine 600 checks whether it has received the input token (step 652). If it has received the input token, the token passing cycle is over and no new connection request has been granted. In that case state machine 600 pulses its END_CYCLE output causing buffer 616 to place the EOC code on the INPUT_PORT lines (step 654) and returns to step 622 (FIG. 21) to await another input token passing cycle.

If at step 652 port RP0 does not have the input token, state machine 600 checks the Q output of flip-flop 610 to determine if input port RP0 has a new connection request (step 655). If not, state machine 600 passes the input token (step 656) and then checks whether the OUTPUT_IDLE line has been asserted (step 658) This indicates that another input port has won the arbitration. IF not, state machine 600 checks the output of comparator 620 to determine if the token passing cycle has ended (step 660). If not, state machine returns to step 650. If input port RP0 is not the input seed (step 650) and state machine 600 has not received the input token (step 652), state machine 600 continues to cycle through steps 658, 660, 650 and 662 until it gets the input token. When it gets the input token, state machine 600 checks the Q output of flip-flop 610 to see if it has a pending new request. In not, it passes the token at step 656. If it does have a new request, state machine 600 asserts the REQ signal to turn on buffer 608, thereby placing the requested destination buffer address on the OUTPUT_PORT lines (step 664). State machine 600 also resets flip-flop 610 (step 664). It then looks at the OUTPUT_IDLE line to determine the requested output port is idle (step 666). If not, state machine 600 passes the input token (step 656).

If the requested output buffer is idle (step 666), state machine 600 moves to step 668. State machine 600 also moves to step 668 from step 658. At this point (step 668), the output arbiter for the requested port has placed a new input seed on the INPUT_PORT lines and allows all input arbiters to compete for a connection to that output port. Thus at step 668, state machine 600 checks the output of comparator 618 to determine if port TP0 is the input seed. If it is the input seed, it again checks the output of comparator 606 to determine if it has a pending request for the output port (step 670). If not, it passes the input token (step 672) and checks the OUTPUT_ARB_CYCLE line for a pulse indicating end of the token passing cycle (step 674). If the token passing cycle is not at an end, state machine 600 reverts to step 668. If input port RP0 is not the input seed (step 668) and does not have the input token (step 676) it moves to step 674. Otherwise it checks the output of comparator 606 to determine if it has a pending request for the output port (step 670).

If it detects a pending request for the output buffer (step 670), state machine 600 pulses the CONSUME signal to turn on buffer 614 thereby placing the ID of port RP0 (MY_ID) on the INPUT_PORT lines (step 678). State machine 600 the waits for a pulse from the central arbitration sequencer (step 680) indicating that the request has been granted. Thereafter state machine 600 pulses the CLEAR signal to clear the request from circuit 602 (step 682) and returns to step 622 (FIG. 21) to await the beginning of the another token passing cycle.

While the forgoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A network switch for routing data packets between a plurality of network stations, comprising:

a plurality of input ports interconnected to form an input token passing ring, each input port including means for passing the input token to a succeeding input port of the ring after receiving an input token from a preceding input port of the ring, and each input port including means for receiving and forwarding data packets from corresponding network station;

a plurality of output ports interconnected to form an output token passing ring, each output port including means for passing an output token from a succeeding output port of the ring after receiving the output token from a preceding output port of the ring, and each output port including means for receiving and forwarding data packets to a corresponding network station;

a switching system connected to said input and output ports for receiving packets forwarded by said input ports and selectively routing them to said output ports in accordance with input routing data; and a global bus interconnecting said input ports, said output ports and said switching system;

wherein when one of said output ports receives the output token and is idle (not currently receiving a packet), it signals the input ports via said global bus to begin passing the input token, and wherein when a token receiving input port has received a packet to be forwarded to the token receiving output port, the token receiving input port sends routing data to said switching system via said global bus.

2. The network switch in accordance with claim 1 wherein the routing data the token receiving input port sends to said switching system identifies the token receiving input port.

3. The network switch in accordance with claim 2 wherein the token receiving output port also includes means for sending routing data to the switching system identifying itself, such that the switching system responds to the routing data from the token receiving input and output ports by routing the packet stored in the token receiving input port to the token receiving output port.

4. The network switch in accordance with claim 1 further comprising sequencer means connected to said global bus for successively signaling said output ports via said global bus to begin passing said output token.

5. The network switch in accordance with claim 4 wherein whenever the sequencer means signals the output ports to begin passing said output token, it transmits to said output ports via said global bus output seed data identifying one of said output ports as an output seed port; and wherein the output seed port, when not idle, responds to the output seed data bypassing the output token and, when idle, signals said input ports via said global bus to begin passing said input token.

6. The network switch in accordance with claim 5 wherein the sequencer means alters the output seed data each time it signals the output ports to begin passing said output token so that successive ones of said output ports are successively identified as said output seed port.

7. The network switch in accordance with claim 6 wherein whenever the output seed port receives the output token, it transmits an end-of-cycle (EOC) signal to the sequencer means via the global bus indicating that the output ports have stopped passing the output token.

8. The network switch in accordance with claim 7 wherein upon receipt of the EOC signal, the sequencer mean signals the output ports to begin passing said output token again.

9. The network switch in accordance with claim 4 wherein when the token receiving input port sends routing data to said switching system, it also transmits an end-of-cycle (EOC) signal to the sequencer means via the global bus indicating that an input ports have stopped passing the input token.

10. The network switch in accordance with claim 9 wherein after receiving the EOC signal, the sequencer means transmits a SAMPLE_EVENTS signal to the input ports via the global bus;

wherein after receiving the SAMPLE_EVENTS signal, each input port having received a packet to be forwarded since previously receiving the SAMPLE_EVENTS signal, transmits a NEW_REQUEST signal to the sequencer means via the global bus; and wherein, upon receiving said NEW_REQUEST signal, said sequencer means signals said output ports to begin passing said output token.

11. The network switch in accordance with claim 9 wherein after receiving the EOC signal, the sequencer means transmits a SAMPLE_EVENTS signal to the output ports via the global bus;

wherein after receiving the SAMPLE_EVENTS signal, each output port having become idle since previously receiving the SAMPLE_EVENTS signal, transmits a NEW_IDLE signal to the sequencer means via the global bus; and wherein, upon receiving said NEW_IDLE signal, said sequencer means signals said output ports to begin passing said output token.

12. The network switch in accordance with claim 1 wherein whenever an idle output port signals the input ports to begin passing said input token, it transmits to said input ports via said global bus input seed data identifying one of said input ports as an input seed port, and wherein the input seed port responds to the input seed data, when not having received a data packet to be forwarded to the output port, by passing the input token and responds to the input seed data, when having received a data packet to be forward to the output port, by forwarding routing data to said switching means via said global bus.

13. The network switch in accordance with claim 12 wherein each output port alters the output seed data each time it signals the input ports to begin passing said input token so that successive ones of said input ports are successively identified as said input seed port.

14. The network switch in accordance with claim 1 wherein each input port encodes each received packet before forwarding it to an output port via said switching system to include symbols indicating beginning and ending portions of the packet, wherein each output port determines when it is receiving a packet and when it is idle by detecting said symbols, and wherein each output port decodes each received packet before forwarding it to a corresponding network station.

15. The network switch in accordance with claim 1 wherein each of said network stations has a unique network address, and wherein packets received by said input ports each include a contain a network address of a destination network station to receive the packet, wherein said network switch further comprises:

address translation means for converting the network address of each network station to a code identifying an output port to which the network station is connected; and translation bus means interconnecting the input ports with said translation means, wherein each of said input ports sends the network address of the destination station included in a received packet to said address translation means via said translation bus, wherein said address translation means translates the network address of the destination station into a code identifying a corresponding output port and returns the code to the sending input port via said translation bus means.

16. The network switch in accordance with claim 3 further comprising sequencer means connected to said global bus for successively signaling said output ports via said global bus to begin passing said output token.

17. The network switch in accordance with claim 16 wherein whenever the sequencer means signals the output ports to begin passing said output token, it transmits to said output ports via said global bus output seed data identifying one of said output ports as an output seed port; and wherein the output seed port responds to the output seed data, if not idle, bypassing the output token and responds to the output seed data, if idle, by signaling said input ports via said global bus to begin passing said input token, the sequencer means altering the output seed data each time it signals the output ports to begin passing said output token so that successive ones of said output ports are successively identified as said output seed port.

18. The network switch in accordance with claim 17 wherein whenever the output seed port receives the output token, it transmits an end-of-cycle (EOC) signal to the sequencer means via the global bus indicating that the output ports have stopped passing the output token; and wherein upon receipt of the EOC signal, the sequencer means signals the output ports to begin passing said output token.

19. The network switch in accordance with claim 17 wherein when the token receiving input port sends routing data to said switching system, it also transmits an end-of-cycle (EOC) signal to the sequencer means via the global bus indicating that the input ports have stopped passing the input token;

wherein after receiving the EOC signal, the sequencer means transmits a SAMPLE_EVENTS signal to the input ports via the global bus;

wherein after receiving the SAMPLE_EVENTS signal, each input port having received a packet to be forwarded since previously receiving the SAMPLE_EVENTS signals, transmits a NEW_REQUEST signal to the sequencer means via the global bus;

wherein, upon receiving said NEW_REQUEST signal, said sequencer means signals said output ports to begin passing said output token;

wherein after receiving the EOC signal, the sequencer means transmits a SAMPLE_EVENTS signal to the output ports via the global bus;

wherein after receiving the SAMPLE_EVENTS signal, each output port having become idle since previously receiving the SAMPLE_EVENTS signal, transmits a NEW_IDLE signal to the sequencer means via the global bus; and wherein, upon receiving said NEW_IDLE signal, said sequencer means signals said output ports to begin passing said output token.

20. The network switch in accordance with claim 17 wherein whenever an idle output port signals the input ports to begin passing said input token, it transmits to said input ports via said global bus input seed data identifying one of said input ports as an input seed port, and wherein the input seed port responds to the input seed data, when not having received a data packet to be forwarded to the output port, bypassing the input token and responds to the input seed data, when having received a data packet to be forward to the output port, by forwarding routing data to said switching means via said global bus; and wherein each output port alters the output seed data each time it signals the input ports to begin passing said input token so that successive ones of said input ports are successively identified as said input seed port.

* * * * *